US012810868B2

(12) United States Patent
Mohammad et al.

(10) Patent No.: US 12,810,868 B2
(45) Date of Patent: Nov. 24, 2026

(54) SPEAKER-SPECIFIC SPEECH FILTERING FOR MULTIPLE USERS

(71) Applicant: QUALCOMM Incorporated, San Diego, CA (US)

(72) Inventors: Asif Mohammad, San Diego, CA (US); Fatemeh Alishahi, Los Angeles, CA (US); Youngkoen Kim, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 495 days.

(21) Appl. No.: 18/069,649

(22) Filed: Dec. 21, 2022

(65) Prior Publication Data

US 2024/0212689 A1 Jun. 27, 2024

(51) Int. Cl.

| | |
|---|---|
| ***G10L 17/02*** | (2013.01) |
| ***G10L 21/0272*** | (2013.01) |
| ***G10L 25/78*** | (2013.01) |

(52) U.S. Cl.

CPC .......... *G10L 17/02* (2013.01); *G10L 21/0272* (2013.01); *G10L 25/78* (2013.01)

(58) Field of Classification Search

CPC ..... G10L 17/02; G10L 21/0272; G10L 25/78; G10L 2021/02087; G10L 17/00; G10L 21/028

See application file for complete search history.

(56) References Cited

U.S. PATENT DOCUMENTS

| | | | | |
|---|---|---|---|---|
| 8,175,291 | B2 | 5/2012 | Chan et al. | |
| 9,640,197 | B1 * | 5/2017 | Fukuda | G10L 21/028 |
| 10,410,650 | B2 * | 9/2019 | Gong | G10L 21/0364 |
| 11,557,278 | B2 * | 1/2023 | Sharifi | G10L 17/22 |
| 2002/0071573 | A1 | 6/2002 | Finn | |
| 2006/0074658 | A1 * | 4/2006 | Chadha | G10L 17/00 704/E15.045 |

(Continued)

FOREIGN PATENT DOCUMENTS

| | | |
|---|---|---|
| WO | 2009086017 | 7/2009 |

OTHER PUBLICATIONS

Shi et al., "Speaker Re-identification with Speaker Dependent Speech Enhancement", Department of Computer Science, University of Sheffield, May 15, 2020, pp. 1-5.

(Continued)

*Primary Examiner* — Fariba Sirjani
(74) *Attorney, Agent, or Firm* — QUALCOMM Incorporated; Espartaco Diaz Hidalgo

(57) ABSTRACT

A device includes one or more processors configured to detect speech of a first user and a second user and to obtain first speech signature data associated with the first user and second speech signature data associated with the second user. The one or more processors are configured to selectively enable a first speaker-specific speech input filter that is based on the first speech signature data to generate a first speech output signal corresponding to the speech of the first user. The one or more processors are also configured to selectively enable a second speaker-specific speech input filter that is based on the second speech signature data to generate a second speech output signal corresponding to the speech of the second user.

30 Claims, 15 Drawing Sheets

(56) References Cited

U.S. PATENT DOCUMENTS

| | | | | |
|---|---|---|---|---|
| 2009/0164212 | A1* | 6/2009 | Chan | G10L 21/0208 704/226 |
| 2015/0301796 | A1* | 10/2015 | Visser | G10L 17/22 715/728 |
| 2016/0171806 | A1* | 6/2016 | Van Dyken | G06V 40/20 367/199 |
| 2018/0108368 | A1* | 4/2018 | Gong | G06F 9/46 |
| 2018/0110614 | A1* | 4/2018 | Hyde | G02C 7/083 |
| 2019/0080693 | A1* | 3/2019 | Barth | G10L 15/22 |
| 2019/0318757 | A1* | 10/2019 | Chen | G10L 17/18 |
| 2020/0184966 | A1 | 6/2020 | Yavagal | |
| 2020/0202853 | A1* | 6/2020 | Ramic | G10L 15/1822 |
| 2020/0296521 | A1* | 9/2020 | Wexler | G06F 3/167 |
| 2021/0168517 | A1* | 6/2021 | Wexler | H04R 25/60 |
| 2021/0256967 | A1* | 8/2021 | Iacobelli | G10L 15/183 |
| 2022/0005451 | A1* | 1/2022 | Tachi | G10K 11/17823 |
| 2022/0028379 | A1* | 1/2022 | Carbune | G06F 16/3344 |
| 2022/0084509 | A1 | 3/2022 | Sivaraman et al. | |
| 2022/0139388 | A1* | 5/2022 | Sharifi | G10L 15/02 704/231 |
| 2022/0199102 | A1* | 6/2022 | Ostrand | H04L 65/1083 |
| 2022/0261218 | A1 | 8/2022 | Shin et al. | |
| 2022/0262371 | A1* | 8/2022 | Kathpal | H04L 51/18 |
| 2023/0074058 | A1* | 3/2023 | Gean | H04S 7/302 |
| 2023/0197076 | A1* | 6/2023 | Yae | H04R 3/005 704/275 |
| 2023/0297329 | A1* | 9/2023 | Jarvis | G10L 17/22 381/110 |
| 2023/0319457 | A1* | 10/2023 | Wang | H04R 3/12 381/86 |
| 2024/0144562 | A1* | 5/2024 | Akmal | G10L 15/005 |
| 2024/0161740 | A1* | 5/2024 | Sharifi | G10L 15/22 |
| 2024/0169995 | A1* | 5/2024 | Sharifi | G10L 17/22 |

OTHER PUBLICATIONS

International Search Report and Written Opinion—PCT/US2023/081166—ISA/EPO—Feb. 5, 2024.

* cited by examiner

SPEAKER-SPECIFIC SPEECH FILTERING FOR MULTIPLE USERS

I. FIELD

The present disclosure is generally related to filtering audio data for processing speech of multiple users.

II. DESCRIPTION OF RELATED ART

Advances in technology have resulted in smaller and more powerful computing devices. Many of these devices can communicate voice and data packets over wired or wireless networks. Further, many such devices incorporate additional functionality such as a digital still camera, a digital video camera, a digital recorder, and an audio file player. Also, such devices can process executable instructions, including software applications, such as a web browser application, that can be used to access the Internet.

Many of these devices incorporate functionality to interact with users via voice commands. For example, a computing device may include a voice assistant application and one or more microphones to generate audio data based on detected sounds. In this example, the voice assistant application is configured to perform various operations, such as sending commands to other devices, retrieving information, and so forth, responsive to speech of a user.

While a voice assistant application can enable hands-free interaction with the computing device, using speech to control the computing device is not without complications. For example, when the computing device is in a noisy environment, it can be difficult to separate speech from background noise. As another example, when multiple people are present, speech from multiple people may be detected, leading to confused input to the computing device and an unsatisfactory user experience.

III. SUMMARY

According to one implementation of the present disclosure, a device includes one or more processors configured to detect speech of a first user and a second user and to obtain first speech signature data associated with the first user and second speech signature data associated with the second user. The one or more processors are configured to selectively enable a first speaker-specific speech input filter that is based on the first speech signature data to generate a first speech output signal corresponding to the speech of the first user. The one or more processors are also configured to selectively enable a second speaker-specific speech input filter that is based on the second speech signature data to generate a second speech output signal corresponding to the speech of the second user.

According to another implementation of the present disclosure, a method includes detecting, at one or more processors, speech of a first user and a second user and obtaining, at the one or more processors, first speech signature data associated with the first user and second speech signature data associated with the second user. The method includes selectively enabling, at the one or more processors, a first speaker-specific speech input filter that is based on the first speech signature data to generate a first speech output signal corresponding to the speech of the first user. The method also includes selectively enabling, at the one or more processors, a second speaker-specific speech input filter that is based on the second speech signature data to generate a second speech output signal corresponding to the speech of the second user.

According to another implementation of the present disclosure, a non-transient computer-readable medium stores instructions that are executable by one or more processors to cause the one or more processors to detect speech of a first user and a second user and to obtain first speech signature data associated with the first user and second speech signature data associated with the second user. The instructions are executable by the one or more processors to selectively enable a first speaker-specific speech input filter that is based on the first speech signature data to generate a first speech output signal corresponding to the speech of the first user. The instructions are further executable by the one or more processors to selectively enable a second speaker-specific speech input filter that is based on the second speech signature data to generate a second speech output signal corresponding to the speech of the second user.

According to another implementation of the present disclosure, an apparatus includes means for detecting speech of a first user and a second user. The apparatus includes means for obtaining first speech signature data associated with the first user and second speech signature data associated with the second user. The apparatus includes means for selectively enabling a first speaker-specific speech input filter that is based on the first speech signature data to generate a first speech output signal corresponding to the speech of the first user. The apparatus also includes means for selectively enabling a second speaker-specific speech input filter that is based on the second speech signature data to generate a second speech output signal corresponding to the speech of the second user.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
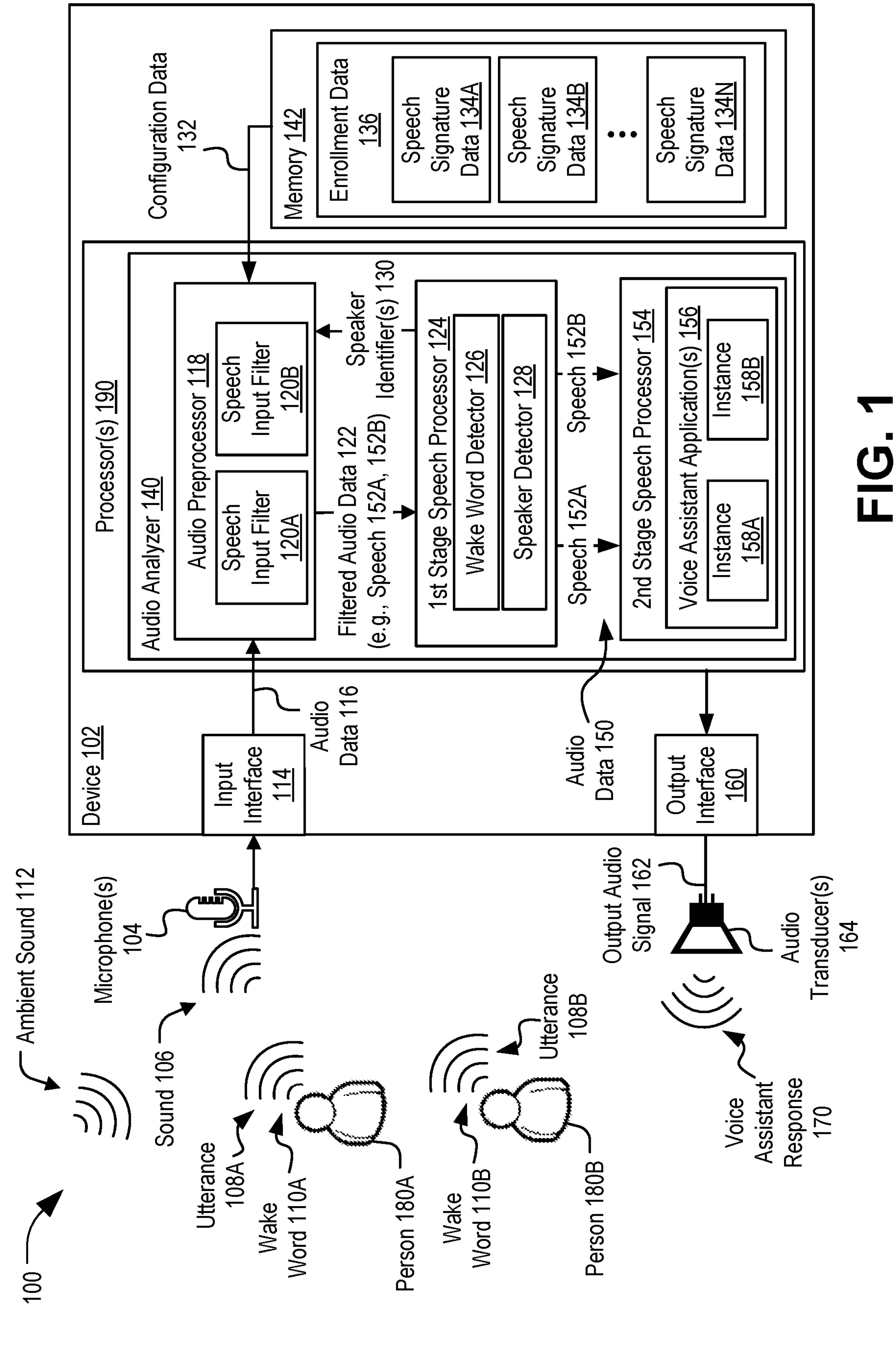
FIG. 1 is a block diagram of a particular illustrative aspect of a system operable to perform speaker-specific speech filtering for multiple users, in accordance with some examples of the present disclosure.

According to particular aspects disclosed herein, speaker-specific speech input filters are selectively used to generate speech inputs for multiple users to one or more voice assistants. For example, in some implementations, each of the speaker-specific speech input filters is activated responsive to detecting speech, such as a wake word in an utterance, from a respective user of the multiple users. In such implementations, each speaker-specific speech input filter, when enabled, is configured to process received audio data to enhance speech of the particular user associated with that speaker-specific speech input filter. Enhancing the speech of the particular user may include, for example, reducing background noise in the audio data, removing speech of one or more other persons from the audio data, etc.

Conventionally, a voice assistant enables hands-free interaction with a computing device; however, when multiple people are present, operation of the voice assistant can be interrupted or confused due to speech from multiple people. As an example, a first person may initiate interaction with the voice assistant by speaking a wake word followed by a command. In this example, if a second person speaks while the first person is speaking to the voice assistant, the speech of the first person and the speech of the second person may overlap such that the voice assistant is unable to correctly interpret the command from the first person. Such confusion leads to an unsatisfactory user experience and waste (because the voice assistant processes audio data without generating the requested result). To illustrate, such confusion can lead to inaccurate speech recognition, resulting in inappropriate responses from the voice assistant.

Another example may be referred to as barging in. In a barging in situation, the first person may initiate interaction with the voice assistant by speaking the wake word followed by a first command. In this example, the second person can interrupt the interaction between the first person and the voice assistant by speaking the wake word (perhaps followed by a second command) before the voice assistant completes operations associated with the first command. When the second person barges in, the voice assistant may cease performing the operations associated with the first command to attend to input (e.g., the second command) from the second person. Barging in leads to an unsatisfactory user experience and waste in a similar manner as confusion because the voice assistant processes audio data associated with the first command without generating the requested result.

As a result of such issues, systems that offer conventional voice assistant services to multiple people, such as in an automobile, limit voice assistant interactions to one person at a time, even though the system may support multiple voice assistants. For example, when an occupant of an automobile engages with a particular voice assistant by speaking a first wake word (e.g., "hey assistant") of the particular voice assistant, all subsequently spoken wake words of the particular voice assistant and of other supported voice assistants are disabled while the particular voice assistant is in a listening mode. The user experience of the occupants of the automobile would be improved if they could engage with voice assistants simultaneously instead of one person at a time.

According to a particular aspect, selectively enabling speaker-specific speech input filters enables an improved user experience and more efficient use of resources (e.g., power, processing time, bandwidth, etc.). For example, a speaker-specific speech input filter may be enabled responsive to detection of a wake word in an utterance from a first person. In this example, the speaker-specific speech input filter is configured, based on speech signature data associated with the first person, to provide filtered audio data corresponding to speech from the first person to a voice assistant. The speaker-specific speech input filter is configured to remove speech from other people from the filtered audio data provided to the voice assistant. Thus, the first person can conduct a voice assistant session without interruption, resulting in improved utilization of resources and an improved user experience.

Another benefit of selectively enabling speaker-specific speech input filters for multiple users is that, because each speaker-specific speech input filter is configured to remove speech from other people, multiple virtual assistant sessions can be conducted simultaneously. To illustrate, the speech of each user engaging in a virtual assistant session is removed from the speech of each other user that is provided to the other users' respective virtual assistant sessions. As a result, each of multiple users can simultaneously engage in a distinct respective voice assistant session without interference between the multiple voice assistant sessions, even when the users are in close proximity to each other, such as when the users are occupants of an automobile, aircraft, or other vehicle.

In the context of automobiles or other vehicles, voice assistant services provided by the vehicle can allow multiple sessions to be conducted by multiple passengers concurrently. According to some aspects, when a voice assistant is invoked by a first occupant in a cabin of a vehicle, other in-cabin occupants can also invoke voice assistants while the voice assistant session with the first occupant is ongoing. For example, occupant identity and zonal information regarding the occupant's location within the vehicle can be used to isolate and distinguish between the speech of multiple occupants to reduce or eliminate interference between multiple parallel voice assistant sessions.

According to some aspects, one or more other modalities and controller area network (CAN) bus information, such as seat weight sensor information, may be used to track the number of seated passengers once the vehicle is in motion. Irrespective of the voice activation or the operating conditions of the vehicle, by monitoring the speech in the vehicle cabin, each seated passenger's identity can be established and "locked" with respect to their location in the cabin. Speaker-dependent speech enhancement is provided in each zone based on the locked identity of the passenger in that zone to create an identity-aware zonal "voice bubble." Other passengers can be enabled to invoke assistants in parallel, or barge in on an existing assistant session, based on each passenger's identity and zonal information. Zonal voice and CAN bus weight sensors in the vehicle cabin may be continually monitored to update the passenger identity information.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular or optional plural (as generally indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 2, multiple microphones are illustrated and associated with reference numbers 104A to 104F. When referring to a particular one of these microphones, such as a microphone 104A, the distinguishing letter "A" is used. However, when referring to any arbitrary one of these microphones or to these microphones as a group, the reference number 104 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 illustrates a particular implementation of a system 100 that is operable to perform speaker-specific speech filtering for multiple users to selectively filter audio data provided to one or more voice assistant applications. The system 100 includes a device 102, which includes one or more processors 190 and a memory 142. The device 102 is coupled to or includes one or more microphones 104 coupled via an input interface 114 to the processor(s) 190, and one or more audio transducers 164 (e.g., a loudspeaker) coupled via an output interface 160 to the processor(s) 190.

In FIG. 1, the microphone(s) 104 are disposed in an acoustic environment to receive sound 106. The sound 106 can include, for example, utterances 108 from one or more persons 180, ambient sound 112, or both. The microphone(s) 104 are configured to provide signals to the input interface 114 to generate audio data 116 representing the sound 106. The audio data 116 is provided to the processor(s) 190 for processing, as described further below.

In the example illustrated in FIG. 1, the processor(s) 190 include an audio analyzer 140. The audio analyzer 140 includes an audio preprocessor 118 and a multi-stage speech processor, including a first stage speech processor 124 and a second stage speech processor 154. In a particular implementation, the first stage speech processor 124 is configured to perform wake word detection, and the second stage speech processor 154 is configured to perform more resource intensive speech processing, such as speech-to-text conversion, natural language processing, and related operations. To conserve resources (e.g., power, processor time, etc.) associated with the resource intensive speech processing performed at the second stage speech processor 154, the first stage speech processor 124 is configured to provide audio data 150 to the second stage speech processor 154 after the first stage speech processor 124 detects a wake word 110 in an utterance 108 from a person 180. In some implementations, the second stage speech processor 154 remains in a low-power or standby state until the first stage speech processor 124 signals the second stage speech processor 154 to wake up or enter a high-power state to process the audio data 150. In some such implementations, the first stage speech processor 124 operates in an always on mode, such that the first stage speech processor 124 is always listening for the wake word 110. However, in other such implementations, the first stage speech processor 124 is configured to be activated by some additional operations, such as a button press.

A technical benefit of such a multi-stage speech processor is that the most resource intensive operations associated with speech processing can be offloaded to the second stage speech processor 154, which may be only active while a voice assistant session is ongoing after a wake word 110 is detected, thus conserving power, processor time, and other computing resources associated with operation of the second stage speech processor 154. In implementations in which power, processor time, and other computing resources are relatively abundant, such as when implemented in a passenger vehicle as described in FIG. 2, the first stage speech processor 124, the second stage speech processor 154, or both, may remain active and may be combined into a single processor stage.

Although the second stage speech processor 154 is illustrated in FIG. 1 as included in the device 102, in some implementations, the second stage speech processor 154 is remote from the device 102. For example, the second stage speech processor 154 may be disposed at a remote voice assistant server. In such implementations, the device 102 transmits the audio data 150 via one or more networks to the second stage speech processor 154 after the first stage speech processor 124 detects the wake word 110. A technical benefit of this arrangement is that communications resources associated with transmission of audio data to the second stage speech processor 154 are conserved since the audio data 150 sent to the second stage speech processor 154 represents only a subset of the audio data 116 generated by the microphone(s) 104. Additionally, power, processor time, and other computing resources associated with operation of the second stage speech processor 154 at the remote voice assistant server are conserved by not sending all of the audio data 116 to the remote voice assistant server.

In FIG. 1, the audio preprocessor 118 includes multiple speech input filters 120 that are configurable to operate as speaker-specific speech input filters. In this context, a "speaker-specific speech input filter" refers to a filter configured to enhance speech of one or more specified persons. For example, a speaker-specific speech input filter associated with the person 180A may be operable to enhance speech of the utterance 108A from the person 180A. To illustrate, enhancing the speech of the person 180A may include de-emphasizing portions (or components) of the audio data 116 that do not correspond to speech from the person 180A, such as portions of the audio data 116 representing the ambient sound 112, portions of the audio data 116 representing the utterance 108B of the person 180B, or both. Similarly, a speaker-specific speech input filter associated with the person 180B may be operable to enhance speech of the utterance 108B from the person 180B, which may include de-emphasizing portions (or components) of the audio data 116 representing the ambient sound 112, portions of the audio data 116 representing the utterance 108A of the person 180A, or both.

In the implementation illustrated in FIG. 1, the speech input filter 120A is configured as a speaker-specific speech input filter to receive the audio data 116 and to generate a speech output signal 152A in which portions or components of the audio data 116 that do not correspond to speech from the person 180A are attenuated or removed. Similarly, the speech input filter 120B is configured as a speaker-specific speech input filter to receive the audio data 116 and to generate a speech output signal 152B in which portions or components of the audio data 116 that do not correspond to speech from the person 180B are attenuated or removed. The speech input filters 120 may include one or more additional input filters (not shown) that are not configured as speaker-specific speech input filters and that may apply general signal filtering (e.g., echo cancellation, noise suppression, etc.) to the audio data 116 to generate an output signal, The speech input filters 120 can also include one or more additional filters (not shown) configured as speaker-specific speech input filters for other users. (As used herein, a "user" of the device 102 is a person that has initiated a voice interaction with the device 102.) In particular, although operation of the device 102 is generally described in the context of providing speaker-specific speech input filtering for the person 180A and the person 180B, the device 102 may be operable to provide speaker-specific speech input filtering for any number of users. The output signals generated by the speech input filters 120 are provided to the first stage speech processor 124 as filtered audio data 122. The filtered audio data 122 can include multi-channel data. For example, the filtered audio data 122 may include a distinct channel for the output of each active speech input filter 120.

In a particular implementation, the processor(s) 190 are configured to selectively enable the speech input filter(s) 120 to operate as speaker-specific speech input filter(s), such as based on detection of the wake word 110. For example, responsive to detecting the wake word 110A in the utterance 108A from the person 180A, the processor(s) 190 retrieve speech signature data 134A associated with the person 180A, and the speech input filter 120A uses the speech signature data 134A to generate the speech output signal 152A corresponding to speech of the person 180A based on the audio data 116. As a simplified example, the speech input filter 120A compares input audio data (e.g., the audio data 116) to the speech signature data 134A to generate the speech output signal 152A that de-emphasizes (e.g., removes) portions or components of the input audio data that do not correspond to speech from the person 180A. Similarly, responsive to detecting the wake word 110B in the utterance 108B from the person 180B, the processor(s) 190 retrieve speech signature data 134B associated with the person 180B, and the speech input filter 120B uses the speech signature data 134B to generate the speech output signal 152B corresponding to the speech of the person 180B based on the audio data 116. In some implementations, the speech input filter(s) 120 include one or more trained models, as described further with reference to FIGS. 4-6, and the speech signature data 134 includes one or more speaker embeddings that are provided, along with the audio data 116, as input to the speech input filters 120 to customize the speech input filters 120 to operate as speaker-specific speech input filters.

In a particular implementation, the audio analyzer 140 includes a speaker detector 128 that is operable to determine a speaker identifier 130 of each person 180 whose speech is detected, or who is detected speaking the wake word 110. For example, in FIG. 1, the audio preprocessor 118 is configured to provide the filtered audio data 122 to the first stage speech processor 124. In this example, prior to detection of the wake word 110 (e.g., when no voice assistant session is in progress), the audio preprocessor 118 may perform non-speaker-specific filtering operations, such as noise suppression, echo cancellation, etc. In this example, the first stage speech processor 124 includes a wake word detector 126 and the speaker detector 128. The wake word detector 126 is configured to detect one or more wake words, such as the wake word 110A in the utterance 108A from the person 180A and the wake word 110B in the utterance 108B from the person 180B. As described further below, different wake words 110 can be used to initiate sessions with different voice assistant applications 156.

In response to detecting the wake word 110, the wake word detector 126 causes the speaker detector 128 to determine an identifier (e.g., the speaker identifier 130) of the person 180 associated with the utterance 108 in which the wake word 110 was detected. In a particular implementation, the speaker detector 128 is operable to generate speech signature data based on the utterance 108 and to compare the speech signature data to speech signature data 134 in the memory 142. The speech signature data 134 in the memory 142 may be included within enrollment data 136 associated with a set of enrolled users associated with the device 102. In other implementations, the device 102 uses sensor data (e.g., image data of a user's face or other biometric data) to identify the person 180 via comparison to corresponding user identification data associated with the speech signature data 134 instead of, or in addition to, using the generated speech signature data. The speaker detector 128 provides a speaker identifier 130 of each detected user to the audio preprocessor 118, and the audio preprocessor 118 retrieves configuration data 132 based on each speaker identifier 130. The configuration data 132 may include, for example, speech signature data 134 of each person 180 associated with an utterance 108 in which a wake word 110 was detected.

In some implementations, the configuration data 132 includes other information in addition to the speech signature data 134 of the person 180 associated with the utterance 108 in which the wake word 110 was detected. For example, the configuration data 132 may include speech signature data 134 associated with multiple persons 180, such as a child and the child's parent, that may be permitted to jointly engage in a voice assistant session at the device 102. In such implementations, the configuration data 132 enables one of the speech input filters 120 to generate a speech output signal 152 based on speech of two or more specific persons.

Thus, in the example illustrated in FIG. 1, after identifying a particular person 180 (or after the wake word 110 is detected in an utterance 108 from a particular person 180), one or more of the speech input filters 120 is configured to operate as a speaker-specific speech input filter associated with the particular person 180 who was identified. Portions of the audio data 116 subsequent to the wake word 110 are processed by the speaker-specific speech input filter(s) such that the audio data 150 provided to the second stage speech processor 154 includes speech of the particular person 180 and omits or de-emphasizes other portions of the audio data 116. For example, a first channel of the audio data 150 provided to the second stage speech processor 154 includes the speech output signal 152A of the person 180A and a second channel of the audio data 150 provided to the second stage speech processor 154 includes the speech output signal 152B of the person 180B when both persons 180A, 180B are speaking at the same time.

The second stage speech processor 154 includes one or more voice assistant applications 156 that are configured to perform voice assistant operations responsive to commands detected within the speech output signals 152. For example, the voice assistant operations may include accessing information from the memory 142 or from another memory, such as a memory of a remote server device. To illustrate, a speech output signal 152 may include an inquiry regarding local weather conditions, and in response to the inquiry, the voice assistant application(s) 156 may determine a location of the device 102 and send a query to a weather database based on the location of the device 102. As another example, the voice assistant operations may include instructions to control other devices (e.g., smart home devices), to output media content, or other similar instructions. When appropriate, the voice assistant application(s) 156 may generate a voice assistant response 170, and the processor(s) 190 may send an output audio signal 162 to the audio transducers 164 to output the voice assistant response 170. Although the example of FIG. 1 illustrates the voice assistant response 170 provided via the audio transducers 164, in other implementations the voice assistant response 170 may be provided via a display device or another output device coupled to the output interface 160.

In some implementations, the audio analyzer 140 is configured to provide the speech output signal 152A as an input to a first voice assistant instance 158A and to provide the speech output signal 152B as an input to a second voice assistant instance 158B that is distinct from the first voice assistant instance 158A. For example, in some implementations, the second stage speech processor 154 is configured to activate the first voice assistant instance 158A based on detection of a first wake word 110 in the speech output signal 152A and activate the second voice assistant instance 158B based on detection of a second wake word 110 in the speech output signal 152B. In an example in which the device 102 supports multiple voice assistant applications 156, the first stage speech processor 124 provides an indication of the wake word 110A spoken by the person 180A, an indication of which of the voice assistant applications 156 corresponds to the wake word 110A, or both, to the second stage speech processor 154. Similarly, the first stage speech processor 124 provides an indication of the wake word 110B spoken by the person 180B, or an indication of which of the voice assistant applications 156 corresponds to the wake word 110B, to the second stage speech processor 154.

In some examples in which the wake word 110A is the same as the wake word 110B, the voice assistant instances 158A and 158B are instances of the same voice assistant application 156 to provide independent voice assistant sessions in parallel to the person 180A and to the person 180B. To illustrate, the first voice assistant instance 158A corresponds to a first instance of a first voice assistant application 156, and the second voice assistant instance 158B corresponds to a second instance of the first voice assistant application 156. In other examples in which the wake word 110A is different from the wake word 110B, the voice assistant instances 158A and 158B are instances of two different voice assistant applications 156 to provide independent voice assistant sessions in parallel to the person 180A and to the person 180B. To illustrate, the first voice assistant instance 158A corresponds to a first voice assistant application 156 (e.g., a voice assistant application native to the processor(s) 190), and the second voice assistant instance 158B corresponds to a second voice assistant application 156 (e.g., a third-party voice assistant application installed on the device 102) that is distinct from the first voice assistant application 156.

Generation of the speech output signal 151A using the speaker-specific speech input filter at the speech input filter 120A substantially prevents the speech of the person 180B from interfering with a voice assistant session of the person 180A with the first voice assistant instance 158A. Similarly, generation of the speech output signal 152B using the speaker-specific speech input filter at the speech input filter 120B substantially prevents the speech of the person 180A from interfering with a voice assistant session of the person 180B with the second voice assistant instance 158B.

A technical benefit of filtering the audio data 116 to remove or de-emphasize portions of the audio data 116 other than the speech of the particular person 180 who spoke the wake word 110 is that such audio filtering operations prevents (or reduces the likelihood of) other persons from barging in to a voice assistant session. For example, when the person 180A speaks the wake word 110A, the device 102 launches the first voice assistant instance 158A, initiates a voice assistant session associated with the person 180A, and configures the speech input filter 120A to de-emphasize portions of the audio data 116 other than speech of the person 180A. In this example, another person 180B is not able to barge in to the voice assistant session because portions of the audio data 116 associated with utterances 108B of the person 180B are not provided to the second stage speech processor 154 in the same channel of the audio data 150 as the speech output signal 152A that is used for the session of the person 180A with the first voice assistant instance 158A. Reducing barging in improves a user experience associated with the voice assistant application(s) 156 and may conserve resources of the second stage speech processor 154 when the utterance 108B of the person 180B is not relevant to the voice assistant session associated with the person 180A. Further, the irrelevant speech may cause the first voice assistant instance 158A to misunderstand the speech of the person 180A associated with the voice assistant session, resulting in the person 180A having to repeat the speech and the voice assistant application(s) 156 having to repeat operations to analyze the speech. Additionally, the irrelevant speech may reduce accuracy of speech recognition operations performed by the first voice assistant instance 158A.

In some cases, the speech of the person 180A and the speech of the person 180B overlap in time. In such cases, the first speaker-specific speech input filter (the speech input filter 120A) suppresses the speech of the person 180B during generation of the speech output signal 152A, and the second speaker-specific speech input filter (the speech input filter 120A) suppresses the speech of the person 180A during generation of the speech output signal 152B. Thus, each person 180A and 180B is prevented from barging in on the voice assistant session of the other person 180A or 180B, enhancing user experience by enabling concurrent voice assistant sessions to be conducted without interfering with each other.

In some implementations, speech that is barging in may be allowed when the speech is relevant to the voice assistant session that is in progress. For example, as described further with reference to FIG. 6, when the audio data 116 includes "barge-in speech" (e.g., speech that is not associated with the person 180 who spoke the wake word 110 to initiate the voice assistant session), the barge-in speech is processed to determine a relevance score, and only barge-in speech associated with a relevance score that satisfies a relevance criterion is provided to the voice assistant application(s) 156.

As one example of operation of the system 100, the microphone(s) 104 detect the sound 106 including the utterance 108A of the person 180A and provide the audio data 116 to the processor(s) 190. Prior to identification of the person 180A and detection of the wake word 110A, the audio preprocessor 118 performs non-speaker-specific audio preprocessing operations such as echo cancellation, noise reduction, etc. Additionally, in some implementations, prior to detection of the wake word 110A, the second stage speech processor 154 remains in a low-power state. In some such implementations, the first stage speech processor 124 operates in an always-on mode, and the second stage speech processor 154 operates in a standby mode or low-power mode until activated by the first stage speech processor 124. The audio preprocessor 118 provides the filtered audio data 122 (without speaker-specific speech output signal(s) 152) to the first stage speech processor 124, which executes the wake word detector 126 to process the filtered audio data 122 to detect the wake word 110A and the speaker detector 128 to identify the person 180A.

The wake word detector 126 detects the wake word 110A, and the speaker detector 128 determines the speaker identifier 130 associated with the person 180A based on speech signature data of the filtered audio data 122, biometric or other sensor data, or a combination thereof. In some implementations, the speaker detector 128 provides the speaker identifier 130 to the audio preprocessor 118, and the audio preprocessor 118 obtains the speech signature data 134A associated with the person 180A. In other implementations, the speaker detector 128 provides the speech signature data 134A to the audio preprocessor 118 as the speaker identifier 130. The speech signature data 134A, and optionally other configuration data 132, are provided to the speech input filter 120A to enable the speech input filter 120A to operate as a speaker-specific speech input filter 120A associated with the first person 180A and generate the speaker-specific speech output signal 152A.

Additionally, based on detecting the wake word 110A, the wake word detector 126 activates the second stage speech processor 154 and causes the speech output signal 152A to be provided to the second stage speech processor 154. The speech output signal 152A includes portions of the audio data 116 after processing by the speaker-specific speech input filter 120A. For example, the speech output signal 152A may include an entirety of the utterance 108A that included the wake word 110A based on processing of the audio data 116 by the speaker-specific speech input filter 120A. To illustrate, the audio analyzer 140 may store the audio data 116 in a buffer and cause the audio data 116 stored in the buffer to be processed by the speaker-specific speech input filter 120A in response to detection of the wake word 110A and identification of the person 180A. In this illustrative example, the portions of the audio data 116 that were received before the speech input filter 120A is configured to be speaker-specific can nevertheless be filtered using the speaker-specific speech input filter 120A before being provided to the second stage speech processor 154.

Also in response to detecting the wake word 110A, the second stage speech processor 154 initiates the first voice assistant instance 158A based on an indication from the first stage speech processor 124 of the wake word 110A, of the particular voice assistant application 156 associated with the wake word 110A, or both, according to some implementations. The second stage speech processor 154 continues to route the channel of the audio data 150 corresponding to the speech output signal 152A to the first voice assistant instance 158A while the voice assistant session between the person 180A and the first voice assistant instance 158A is ongoing.

In some implementations, after enabling the speaker-specific speech input filter 120A, the utterance 108B of the person 180B is included in the audio data 116 while the person 180A continues talking during the voice assistant session. The audio data 116 is filtered through both the speaker-specific speech input filter 120A and the speech input filter 120B. The output of the speaker-specific speech input filter 120A may be received at the first stage speech processor 124 (e.g., as a first channel of the filtered audio data 122) and routed to the second stage speech processor 154 as the speech output signal 152A. In addition, the output of the speech input filter 120B may be concurrently provided to the first stage speech processor 124 (e.g., as a second channel of the filtered audio data 122) for wake word detection and speaker detection processing.

In response to the wake word detector 126 detecting the wake word 110B in the output of the speech input filter 120B and the speaker detector 128 identifying the person 180B as the speaker of the wake word 110B, the audio preprocessor 118 obtains the speech signature data 134B associated with the person 180B in a similar manner as described above. The speech signature data 134B, and optionally other configuration data 132, are provided to the speech input filter 120B to enable the speech input filter 120B to operate as a speaker-specific speech input filter 120B associated with the person 180B and generate the speech output signal 152B. The speech output signal 152 is sent to the first stage speech processor 124 (e.g., as the second channel of the filtered audio data 122) and routed to the second stage speech processor 154 as a second channel of the audio data 150. In addition, the audio preprocessor 118 may designate another speech input filter 120 (not shown) to continue performing non-speaker-specific filtering (generating a third channel of the filtered audio data 122) so that wake word processing and speaker detection processing can continue at the first stage speech processor 124 to detect any wake word 110 that may be spoken by another person 180 (not shown).

Also in response to detecting the wake word 110B, the second stage speech processor 154 initiates the second voice assistant instance 158B, such as based on an indication from the first stage speech processor 124 of the wake word 110B, of the particular voice assistant application 156 associated with the wake word 110B, or both, according to some implementations. The second stage speech processor 154 continues to route the channel of the audio data 150 corresponding to the speech output signal 152B to the second voice assistant instance 158B while the voice assistant session between the person 180B and the second voice assistant instance 158B is ongoing.

In particular implementations, each voice assistant session continues until a termination condition for that session is satisfied. For example, the termination condition with a particular person 180 may be satisfied when a particular duration of the voice assistant session has elapsed, when a voice assistant operation that does not require a response or further interactions with the particular person 180 is performed, or when the particular person 180 instructs termination of the voice assistant session.

In some implementations, the configuration data 132 provided to the audio preprocessor 118 to configure the speech input filter(s) 120 is based on speech signature data 134 associated with multiple persons. In such implementations, the configuration data 132 enables the speech input filter(s) 120 to operate as speaker-specific speech input filter(s) 120 associated with the multiple persons. To illustrate, when configuration data 132 provided to a single speech input filter 120 is based on speech signature data 134A associated with the person 180A and speech signature data 134B associated with the person 180B, that speech input filter 120 can be configured to operate as speaker-specific speech input filter 120 associated with the person 180A and the person 180B. An example of an implementation in which the speech signature data 134 based on speech of multiple persons may be used includes a situation in which the person 180A is a child and the person 180B is a parent. In this situation, the parent may have permissions, based on the configuration data 132, that enable the parent to barge in to any voice assistant session initiated by the child.

In a particular implementation, the speech signature data 134 associated with a particular person 180 includes a speaker embedding. For example, during an enrollment operation, the microphone(s) 104 may capture speech of a person 180 and the speaker detector 128 (or another component of the device 102) may generate a speaker embedding. The speaker embedding may be stored at the memory 142 along with other data, such as a speaker identifier of the particular person 180, as the enrollment data 136. In the example illustrated in FIG. 1, the enrollment data 136 includes three sets of speech signature data 134, including speech signature data 134A, speech signature data 134B, and speech signature data 134N. However, in other implementations, the enrollment data 136 includes more than three sets of speech signature data 134 or fewer than three sets of speech signature data 134. The enrollment data 136 optionally also includes information specifying sets of speech signature data 134 that are to be used together, such as in the example above in which a parent's speech signature data 134 is provided to the audio preprocessor 118 along with a child's speech signature data 134.

In some implementations, once a particular person 180 is identified, the device 102 records data indicating the location of the particular person 180, and the speaker detector 128 can use the location data to identify the particular person 180 as the source of future utterances. For example, the microphone(s) 104 can correspond to a microphone array, and the audio preprocessor 118 can obtain location data of a particular person 180 via one or more location or source separation techniques, such as time of arrival, angle of arrival, multilateration, etc. In some implementations, the device 102 assigns each detected person into a particular zone of multiple logical zones based on that person's location, and may perform beamforming or other techniques to attenuate speech originating from persons in other zones, such as described further with reference to FIG. 2.

Figure 2:
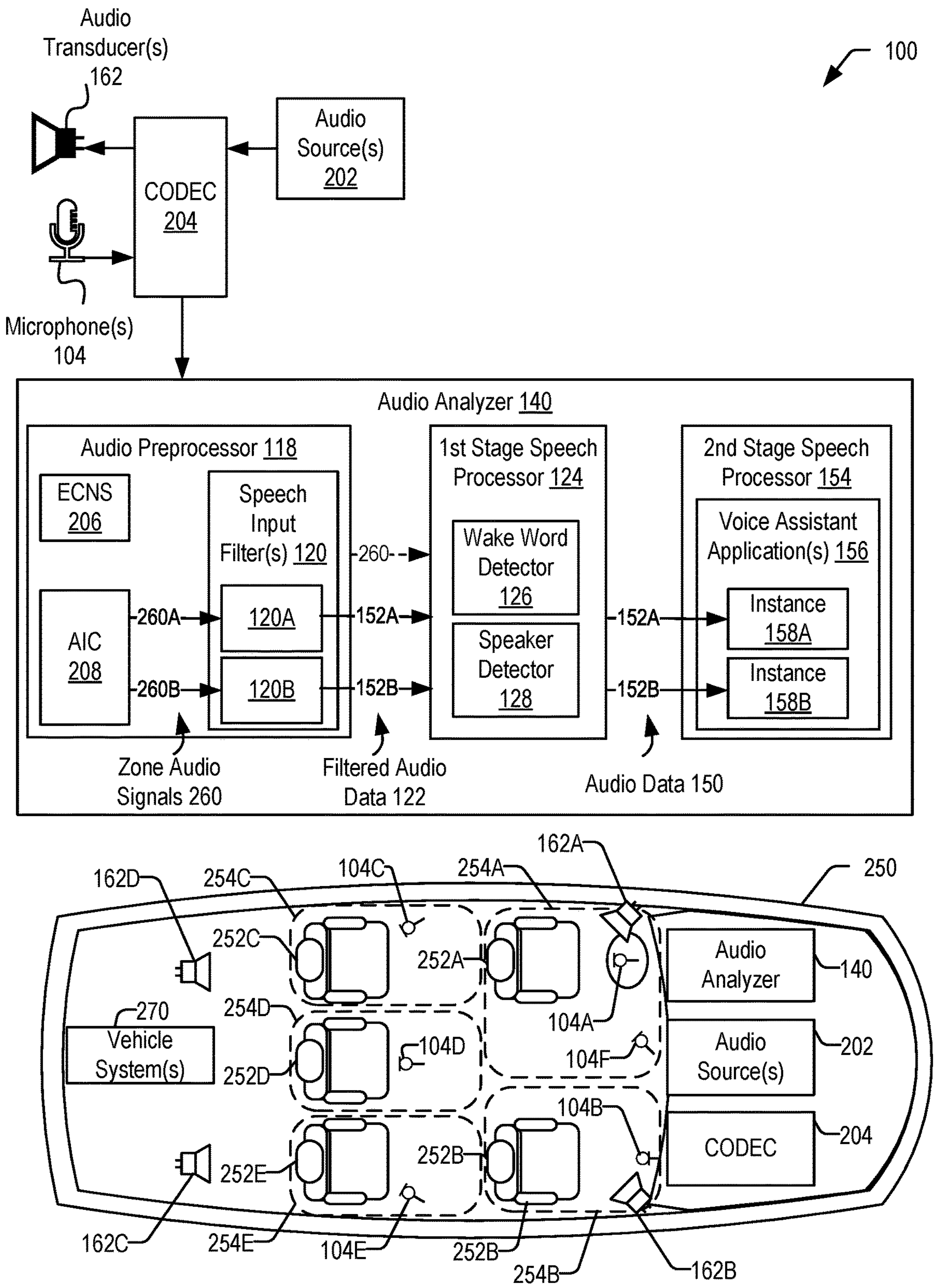
FIG. 2 is a diagram of a first example of a vehicle operable to perform speaker-specific speech filtering for multiple users, in accordance with some examples of the present disclosure.

FIG. 2 is a diagram of an example of a vehicle 250 operable to perform speaker-specific speech filtering for multiple users, in accordance with some examples of the present disclosure. In FIG. 2, the system 100 or portions thereof are integrated within the vehicle 250, which in the example of FIG. 2 is illustrated as an automobile including a plurality of seats 252A-252E. Although the vehicle 250 is illustrated as an automobile in FIG. 2, in other implementations, the vehicle 250 is a bus, a train, an aircraft, a watercraft, or another type of vehicle configured to transport one or more passengers (which may optionally include a vehicle operator).

The vehicle 250 includes the audio analyzer 140 and one or more audio sources 202. The audio analyzer 140 and the audio source(s) 202 are coupled to the microphone(s) 104, the audio transducer(s) 164, or both, via a CODEC 204. The vehicle 250 of FIG. 2 also includes one or more vehicle systems 270, some or all of which may be coupled to the audio analyzer 140 to enable the voice assistant application(s) 156 to control various operations of the vehicle system(s) 270.

In FIG. 2, the vehicle 250 includes a plurality of microphones 104A-104F. For example, in FIG. 2, each microphone 104 is positioned near a respective one of the seats 252A-252E. In the example of FIG. 2, the positioning of the microphones 104 relative to the seats 252 enables the audio analyzer 140 to distinguish among audio zones 254 of the vehicle 250. In FIG. 2, there is a one-to-one relationship between the audio zones 254 and the seats 252. In some other implementations, one or more of the audio zones 254 includes more than one seat 252. To illustrate, the seats 252C-252E may be associated with a single "back seat" audio zone.

Although the vehicle 250 of FIG. 2 is illustrated as including a plurality of microphones 104A-104F arranged to detect sound within the vehicle 250 and optionally to enable the audio analyzer 140 to distinguish which audio zone 254 includes a source of the sound, in other implementations, the vehicle 250 includes only a single microphone 104. In still other implementations, the vehicle 250 includes multiple microphones 104 and the audio analyzer 140 does not distinguish among the audio zones 254.

In FIG. 2, the audio analyzer 140 includes the audio preprocessor 118, the first stage speech processor 124, and the second stage speech processor 154, each of which operate as described in FIG. 1. In the particular example illustrated in FIG. 2, the audio preprocessor 118 includes the speech input filter(s) 120, which are configurable to operate as speaker-specific speech input filters to selectively filter audio data for speech processing.

The audio preprocessor 118 in FIG. 2 also includes an echo cancelation and noise suppression (ECNS) unit 206 and an adaptive interference canceller (AIC) 208. The ECNS unit 206 and the AIC 208 are operable to filter audio data from the microphone(s) 104 independently of the speech input filter(s) 120. For example, the ECNS unit 206, the AIC 208, or both, may perform non-speaker-specific audio filtering operations. To illustrate, the ECNS unit 206 is operable to perform echo cancellation operations, noise suppression operations (e.g., adaptive noise filtering), or both. The AIC 208 is configured to distinguish among the audio zones 254, and optionally, to limit the audio data provided to individual speech input filters 120 to audio from a particular respective one or more of the audio zones 254. To illustrate, when a user (e.g., a person 180 occupying one of the seats 252) is detected in a particular zone, the AIC 208 may generate an audio signal for that particular zone that attenuates or removes audio from sources that are outside that particular zone, illustrated as zone audio signals 260.

The audio analyzer 140 is configured to selectively enable individual speech input filters 120 to operate as speaker-specific speech input filters 120 based on detecting the locations of users within the vehicle 250. To illustrate, when a first user and a second user (e.g., the person 180A and the person 180B, respectively) are in the vehicle 250, the audio analyzer 140 is configured to selectively enable the first speaker-specific speech input filter 120A based on a first seating location within the vehicle 250 of the first user and to selectively enable the second speaker-specific speech input filter 120B based on a second seating location within the vehicle 250 of the second user.

To illustrate, the audio analyzer 140 is configured to detect, based on sensor data from one or more sensors of the vehicle 250, that the first user is at the first seating location and that the second user is at the second seating location. As an example, the sensor data can correspond to the audio data 116 that is received via the microphones 104 and that is used to both identify, based on operation of the AIC 208 and the speaker detector 128, the seating location of each source of speech (e.g., each user that speaks) that is detected in the vehicle 250 as well as the identity of each detected user via comparison of speech signatures as described previously. Alternatively, or in addition, the sensor data can correspond to data generated by one or more cameras, seat weight sensors, other sensors that can be used to locate the seating position of occupants in the vehicle 250, or a combination thereof.

In some implementations, selectively enabling the speaker-specific speech input filters 120 is performed on a per-zone basis and includes generation of distinct per-zone audio signals. To illustrate, the audio analyzer 140 (e.g., the AIC 208) processes the audio data 116 received from the microphones 104 to generate a first zone audio signal 260A. The first zone audio signal 260A includes sounds originating in a first zone (e.g., the zone 254A that includes the seating location of a first user) of the multiple logical zones 254 of the vehicle 250 and that at least partially attenuates sounds originating outside of the first zone. The audio analyzer 140 also generates a second zone audio signal 260B that includes sounds originating in a second zone (e.g., the zone 254B that includes the seating location of a second user) and that at least partially attenuates sounds originating outside of the second zone.

The audio analyzer 140 enables selected speech input filter(s) 120 to function as speaker-specific speech input filter for particular zone audio signals 260 associated with detected users, resulting in identity-aware zonal voice bubbles for each identified user. To illustrate, audio source separation applied in conjunction with the zones 254 separates speech by virtue of the location of each user, and the speaker-specific speech enhancement in each zone 254 creates additional isolation of each user's speech. For example, if a first user in the first zone 254A leans into the second zone 254B occupied by a second user and speaks, zonal source separation alone may not filter out the first user's speech from the second user's speech in the second zone 254B; however, the first user's speech is filtered by speaker dependent speech input filtering applied to audio of the second zone 254B.

In an example, the first speaker-specific speech input filter 120A is enabled as part of a first filtering operation of the first zone audio signal 260A to enhance the speech of the first user, attenuate sounds other than the speech of the first user, or both, to generate the first speech output signal 152A. Similarly, the second speaker-specific speech input filter 120B is enabled as part of a second filtering operation of the second zone audio signal 260B to enhance the speech of the second user, attenuate sounds other than the speech of the second user, or both, to generate the second speech output signal.

In some implementations, when a particular user is detected in a particular zone but no speech signature data 134 is available for the user, such as when the particular user is a guest in the vehicle 250, the audio analyzer 140 processes the zone audio signal 260 for the particular zone using a (non-speaker-specific) speech input filter 120. The audio analyzer 140 may also process the speech of the particular user to generate speech signature data 134 for the user. Although filtering using an initial version of the speech signature data 134 for the user, based on a relatively small number of utterances processed by the device 102, may be relatively ineffective at distinguishing between speech of the particular user and speech of other people, one or more updated versions of the speech signature data 134 may be generated as more speech of the particular user becomes available for processing, enhancing the effectiveness of the speech signature data 134 to enable use of a speech input filter 120 as a speaker-specific speech input filter 120. Thus, the speech signature data 134 of the particular user can be added to the enrollment data 136 and used to identify the user and to enable speaker-specific speech filtering without the particular user participating an enrollment operation.

During operation, one or more of the microphone(s) 104 may detect sounds within the vehicle 250 and provide audio data representing the sounds to the audio analyzer 140. In an example in which the person 180A is seated in the zone 254A, when no voice assistant session for the zone 254A is in progress, the ECNS unit 206, the AIC 208, or both, process the audio data to generate filtered audio data (e.g., the filtered audio data 122) that attenuates sound from source(s) outside of the zone 254A and provide the filtered audio data as a zone audio signal 260 to the first stage speech processor 124.

In some implementations, the filtered audio data of the zone 254A is processed by the speaker detector 128 to identify the person 180A as a user whose speech is included in the filtered audio data based on a speech signature comparison. In other implementations, the speaker detector 128 does not operate to identify the person 180A until after the wake word detector 126 detects a wake word (e.g., the wake word 110 of FIG. 1) in the filtered audio data for the zone 254A. In response to identifying the person 180A in that zone, the speech input filter 120A is activated as a speaker-specific speech input filter for the zone 254A. The speaker-specific speech input filter 120A processes the zone audio signal 260A from the AIC 208 and generates the speech output signal 152A for speech of the person 180A in the zone 254A.

Additionally, the wake word detector 126 processes the filtered audio data of the zone 254A (if the person 180A has not yet been identified) or the speech output signal 152A for the zone 254A (if the person 180A has been identified). In response to detecting a wake word, if the second stage speech processor 154 is not in active state, the wake word detector 126 activates the second stage speech processor 154 to initiate a voice assistant session associated with the zone 254A. The first stage speech processor 124 provides the speech output signal 152A and may further provide an indication of the wake word spoken by the person 180A or an indication of which voice assistant application 156 is associated with the wake word to the second stage speech processor 154. The second stage speech processor 154 initiates the first voice assistant instance 158A of the voice assistant application 156 that is associated with the wake word and routes the speech output signal 152A associated with the zone 254A to the first voice assistant instance 158A while the voice assistant session between the person 180A and the first voice assistant instance 158A is ongoing.

Based on content of speech represented in the audio data from the person 180A in the zone 254A, the first voice assistant instance 158A may control operation of the audio source(s) 202, control operation of the vehicle system(s) 270, or perform other operations, such as retrieve information from a remote data source.

A response (e.g., the voice assistant response 170) from the first voice assistant instance 158A may be played out to occupants of the vehicle 250 via the audio transducer(s) 164. In the example illustrated in FIG. 2, the audio transducers 164 are disposed near or in particular ones of the audio zones 254, which enables individual instances of the voice assistant application(s) 156 to provide responses to a particular occupant (e.g., an occupant who initiated the voice assistant session) or to multiple occupants of the vehicle 250.

The above example describing operation with regard to detecting speech of an occupant in the zone 254A may also be duplicated for each zone 254 in which an audio source (e.g., an occupant) is detected. Thus, the system 100 enables multiple occupants of the vehicle 250 to simultaneously engage in voice assistant sessions using a dedicated speaker-specific speech input filter 120 and a corresponding dedicated voice assistant instance 158 for each occupied zone 254.

Selective operation of the speech input filter(s) 120 as speaker-specific speech input filters enables more accurate speech recognition by the voice assistant application(s) 156 since noise and irrelevant speech is removed from the audio data provided to the voice assistant application(s) 156. Additionally, the selective operation of the speech input filter(s) 120 as speaker-specific speech input filters and the interference cancellation performed by the AIC 208 limit the ability of other occupants in the vehicle 250 to barge in to a voice assistant session. For example, if a driver of the vehicle 250 initiates a voice assistant session to request driving directions, the voice assistant session can be associated with only the driver (or as described above with one or more other persons) such that other occupants of the vehicle 250 are not able to interrupt the voice assistant session.

Figure 3A:
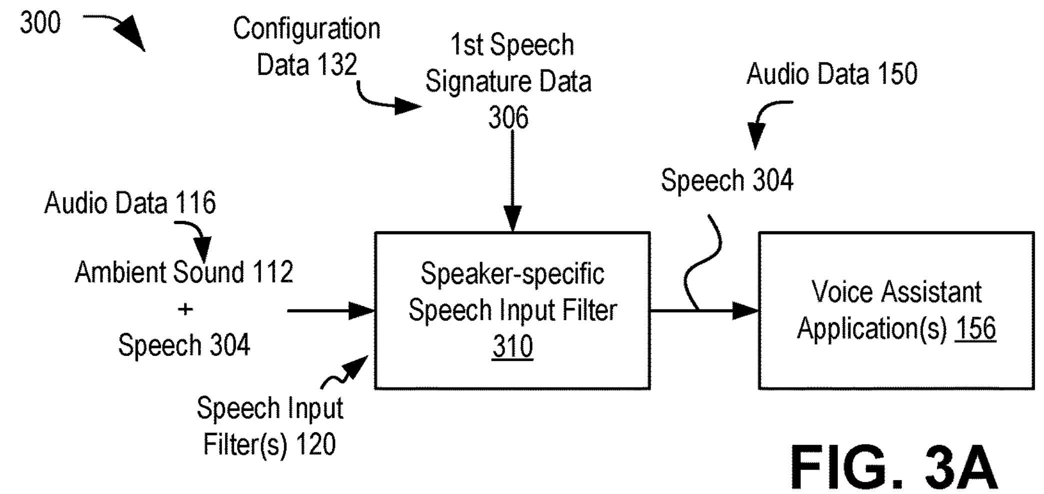
FIG. 3A is a diagram of an illustrative aspect of operations associated with speaker-specific speech filtering for multiple users, in accordance with some examples of the present disclosure.
Figure 3B:
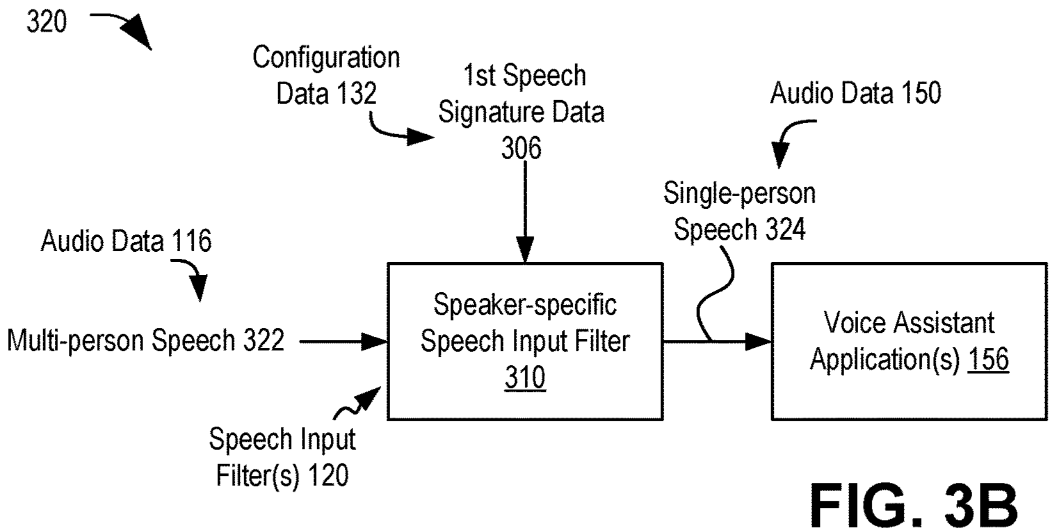
FIG. 3B is a diagram of an illustrative aspect of operations associated with speaker-specific speech filtering for multiple users, in accordance with some examples of the present disclosure.
Figure 3C:
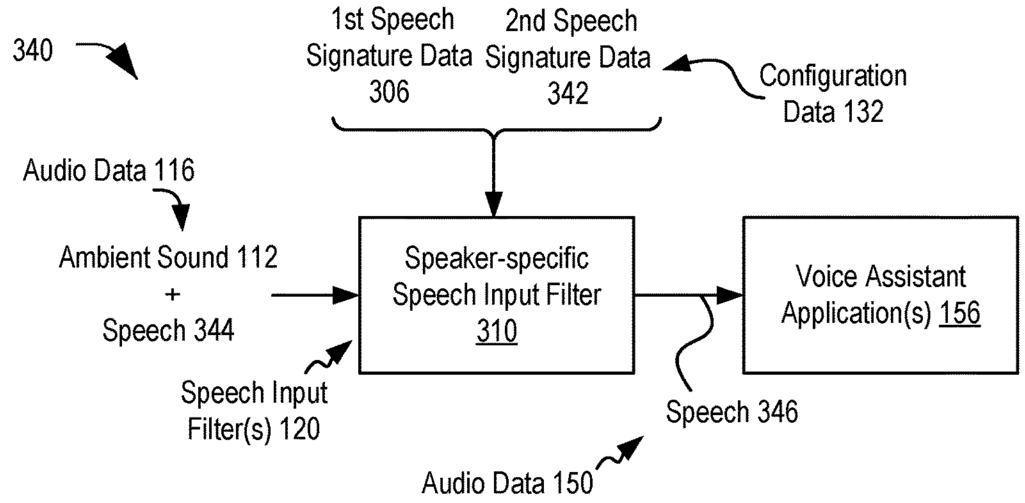
FIG. 3C is a diagram of an illustrative aspect of operations associated with speaker-specific speech filtering for multiple users, in accordance with some examples of the present disclosure.

FIGS. 3A-3C illustrate aspects of operations associated with speaker-specific speech filtering for multiple users, in accordance with some examples of the present disclosure. Referring to FIG. 3A, a first example 300 is illustrated. In the first example 300, the configuration data 132 used to configure the speech input filter(s) 120 to operate as a speaker-specific speech input filter 310 includes first speech signature data 306. The first speech signature data 306 includes, for example, a speaker embedding associated with a first person, such as the person 180A of FIG. 1.

In the first example 300, the audio data 116 provided as input to the speaker-specific speech input filter 310 includes ambient sound 112 and speech 304. The speaker-specific speech input filter 310 is operable to generate as output the audio data 150 (e.g., a speech output signal 152) based on the audio data 116. In the first example 300, the audio data 150 includes the speech 304 and does not include or de-emphasizes the ambient sound 112. For example, the speaker-specific speech input filter 310 is configured to compare the audio data 116 to the first speech signature data 306 to generate the audio data 150. The audio data 150 de-emphasizes portions of the audio data 116 that do not correspond to the speech 304 from the person associated with the first speech signature data 306.

In the first example 300 illustrated in FIG. 3A, the audio data 150 representing the speech 304 is provided to the voice assistant application(s) 156 as part of a voice assistant session. Further, a portion of the audio data 116 that represents the ambient sound 112 is de-emphasized in or omitted from the audio data 150 provided to the voice assistant application(s) 156. A technical benefit of filtering the audio data 116 to de-emphasize or omit the ambient sound 112 from the audio data 150 is that such filtering enables the voice assistant application(s) 156 to more accurately recognize speech in the audio data 150, which reduces an error rate of the voice assistant application(s) 156 and improves the user experience.

Referring to FIG. 3B, a second example 320 is illustrated. In the second example 320, the configuration data 132 used to configure the speech input filter(s) 120 includes the first speech signature data 306 of FIG. 3A. For example, the first speech signature data 306 includes a speaker embedding associated with a first person, such as the person 180A of FIG. 1.

In the second example 320, the audio data 116 provided as input to the speaker-specific speech input filter 310 includes multi-person speech 322, such as speech of the person 180A and speech of the person 180B of FIG. 1. The speaker-specific speech input filter 310 is operable to generate as output the audio data 150 based on the audio data 116. In the second example 320, the audio data 150 includes single-person speech 324, such as speech of the person 180A. In this example, speech of one or more other persons, such as speech of the person 180B, is omitted from or de-emphasized in the audio data 150. For example, the audio data 150 de-emphasizes portions of the audio data 116 that do not correspond to the speech from the person associated with the first speech signature data 306.

In the second example 320 illustrated in FIG. 3B, the audio data 150 representing the single-person speech 324 (e.g., speech of the person who initiated the voice assistant session) is provided to the voice assistant application(s) 156 as part of the voice assistant session. Further, a portion of the audio data 116 that represents the speech of other persons (e.g., speech of persons who did not initiate the voice assistant session) is de-emphasized in or omitted from the audio data 150 provided to the voice assistant application(s) 156. A technical benefit of filtering the audio data 116 to de-emphasize or omit the speech of persons who did not initiate a particular voice assistant session is that such filtering limits the ability of such other persons to barge in on the voice assistant session.

Although FIG. 3B does not specifically illustrate the ambient sound 112 in the audio data 116 provided to the speaker-specific speech input filter 310, in some implementations, the audio data 116 in the second example 320 also includes the ambient sound 112. In such implementations, the speaker-specific speech input filter 310 performs both speaker separation (e.g., to distinguish the single-person speech 324 from the multi-person speech 322) and noise reduction (e.g., to remove or de-emphasize the ambient sound 112).

Referring to FIG. 3C, a third example 340 is illustrated. In the third example 340, the configuration data 132 used to configure the speech input filter(s) 120 includes the first speech signature data 306 and second speech signature data 342. For example, the first speech signature data 306 includes a speaker embedding associated with a first person, such as the person 180A of FIG. 1, and the second speech signature data 342 includes a speaker embedding associated with a second person, such as the person 180B of FIG. 1.

In the third example 340, the audio data 116 provided as input to the speaker-specific speech input filter 310 includes ambient sound 112 and speech 344. The speech 344 may include speech of the first person, speech of the second person, speech of one or more other persons, or any combination thereof. The speaker-specific speech input filter 310 is operable to generate as output the audio data 150 based on the audio data 116. In the third example 340, the audio data 150 includes speech 346. The speech 346 includes speech of the first person (if any is present in the audio data 116), speech of the second person (if any is present in the audio data 116), or both. Further, in the audio data 150, the ambient sound 112 and speech of other persons are de-emphasized (e.g., attenuated or removed). That is, portions of the audio data 116 that do not correspond to the speech from the first person associated with the first speech signature data 306 or speech from the second person associated with the second speech signature data 342 are de-emphasized in the audio data 150.

In the third example 340 illustrated in FIG. 3C, the audio data 150 representing the speech 346 is provided to the voice assistant application(s) 156 as part of a voice assistant session. Further, a portion of the audio data 116 that represents the ambient sound 112 or speech of other persons is de-emphasized in or omitted from the audio data 150 provided to the voice assistant application(s) 156. A technical benefit of filtering the audio data 116 to de-emphasize or omit the speech of some persons (e.g., persons not associated with the first speech signature data 306 or the second speech signature data 342) while still allowing multi-person speech (e.g., speech from persons associated with the first speech signature data 306 or the second speech signature data 342) to pass to the voice assistant application(s) 156 is that such filtering enables limited barge in capability for particular users. For example, multiple members of a family may be permitted to barge in on one another's voice assistant sessions while other persons are prevented from barging in to voice assistant sessions initiated by the members of the family.

Figure 4:
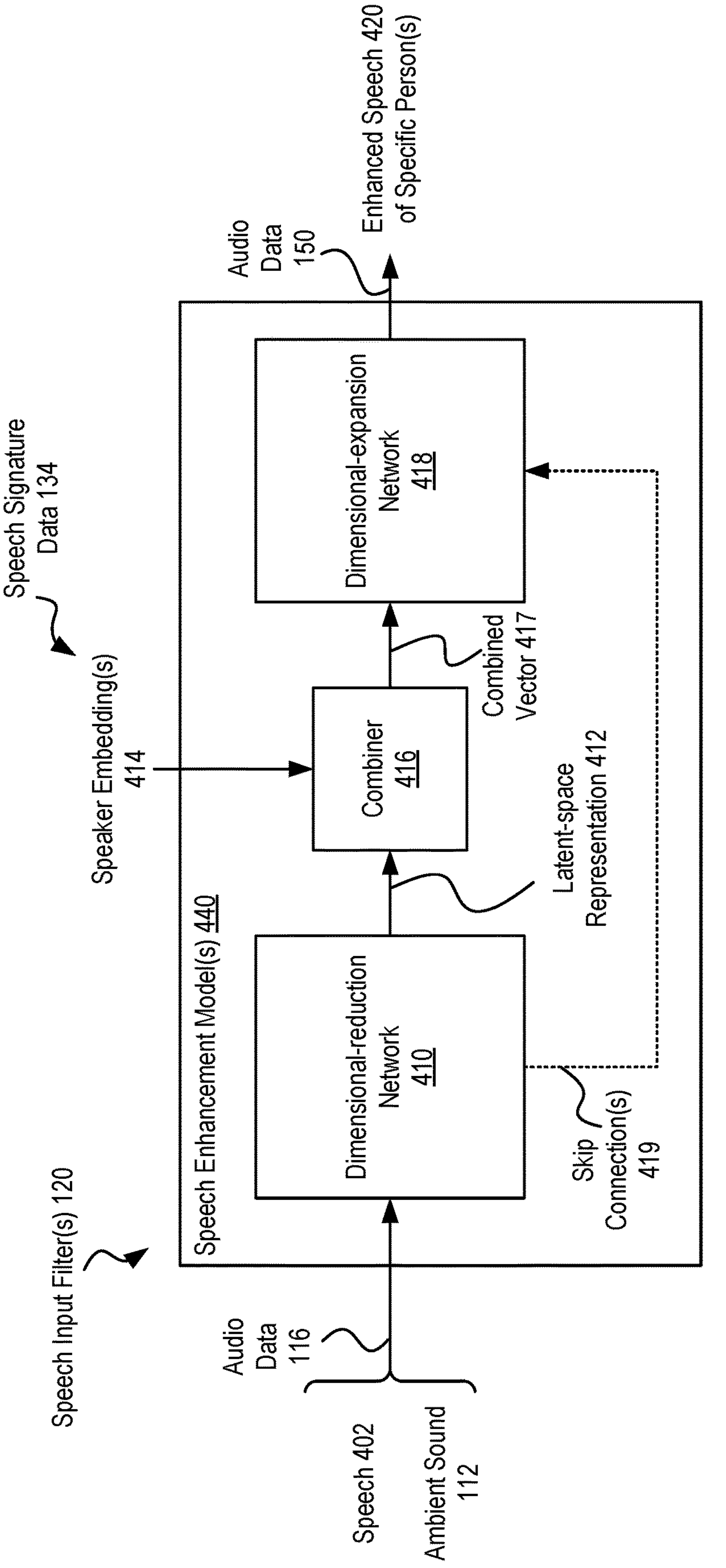
FIG. 4 is a diagram of an illustrative aspect of operations associated with speaker-specific speech filtering for multiple users, in accordance with some examples of the present disclosure.

FIG. 4 illustrates a specific example of the speech input filter(s) 120. In the example illustrated in FIG. 4, the speech input filter(s) 120 include or correspond to one or more speech enhancement models 440. The speech enhancement model(s) 440 include one or more machine-learning models that are configured and trained to perform speech enhancement operations, such as denoising, speaker separation, etc. In the example illustrated in FIG. 4, the speech enhancement model(s) 440 include a dimensional-reduction network 410, a combiner 416, and a dimensional-expansion network 418. The dimensional-reduction network 410 includes a plurality of layers (e.g., neural network layers) arranged to perform convolution, pooling, concatenation, and so forth, to generate a latent-space representation 412 based on the audio data 116. In an example, the audio data 116 is input to the dimensional-reduction network 410 as a series of input feature vectors, where each input feature vector of the series represents one or more audio data samples (e.g., a frame or another portion) of the audio data 116, and the dimensional-reduction network 410 generates a latent-space representation 412 associated with each input feature vector. The input feature vectors may include, for example, values representing spectral features of a time-windowed portion of the audio data 116 (e.g., a complex spectrum, a magnitude spectrum, a mel spectrum, a bark spectrum, etc.), cepstral features of a time-windowed portion of the audio data 116 (e.g., mel frequency cepstral coefficients, bark frequency cepstral coefficients, etc.), or other data representing a time-windowed portion of the audio data 116.

The combiner 416 is configured to combine the speaker embedding(s) 414 and the latent-space representation 412 to generate a combined vector 417 as input for the dimensional-expansion network 418. In an example, the combiner 416 includes a concatenator that is configured to concatenate the speaker embedding(s) 414 to the latent-space representation 412 of each input feature vector to generate the combined vector 417.

The dimensional-expansion network 418 includes one or more recurrent layers (e.g., one or more gated recurrent unit (GRU) layers), and a plurality of additional layers (e.g., neural network layers) arranged to perform convolution, pooling, concatenation, and so forth, to generate the audio data 150 based on the combined vector 417.

Optionally, the speech enhancement model(s) 440 may also include one or more skip connections 419. Each skip connection 419 connects an output of one of the layers of the dimensional-reduction network 410 to an input of a respective one of the layers of the dimensional-expansion network 418.

During operation, the audio data 116 (or feature vectors representing the audio data 116) is provided as input to the speech enhancement model(s) 440. The audio data 116 may include speech 402, the ambient sound 112, or both. The speech 402 can include speech of a single person or speech of multiple persons.

The dimensional-reduction network 410 processes each feature vector of the audio data 116 through a sequence of convolution operations, pooling operations, activation layers, recurrent layers, other data manipulation operations, or any combination thereof, based on the architecture and training of the dimensional-reduction network 410, to generate a latent-space representation 412 of the feature vector of the audio data 116. In the example illustrated in FIG. 4, generation of the latent-space representation 412 of the feature vector is performed independently of the speech signature data 134. Thus, the same operations are performed irrespective of who initiated a voice assistant session.

The speaker embedding(s) 414 are speaker specific and are selected based on a particular person (or persons) whose speech is to be enhanced. Each latent-space representation 412 is combined with the speaker embedding(s) 414 to generate a respective combined vector 417, and the combined vector 417 is provided as input to the dimensional-expansion network 418. As described above, the dimensional-expansion network 418 includes at least one recurrent layer, such as a GRU layer, such that each output vector of the audio data 150 is dependent on a sequence of (e.g., more than one of) the combined vectors 417. In some implementations, the dimensional-expansion network 418 is configured (and trained) to generate enhanced speech 420 of a specific person as the audio data 150. In such implementations, the specific person whose speech is enhanced is the person whose speech is represented by the speaker embedding 414. In some implementations, the dimensional-expansion network 418 is configured (and trained) to generate enhanced speech 420 of more than one specific person as the audio data 150. In such implementations, the specific persons whose speech is enhanced are the persons associated with the speaker embeddings 414.

The dimensional-expansion network 418 can be thought of as a generative network that is configured and trained to recreate that portion of an input audio data stream (e.g., the audio data 116) that is similar to the speech of a particular person (e.g., the person associated with the speaker embedding 414). Thus, the speech enhancement model(s) 440 can, using one set of machine-learning operations, perform both noise reduction and speaker separation to generate the enhanced speech 420.

Figure 5:
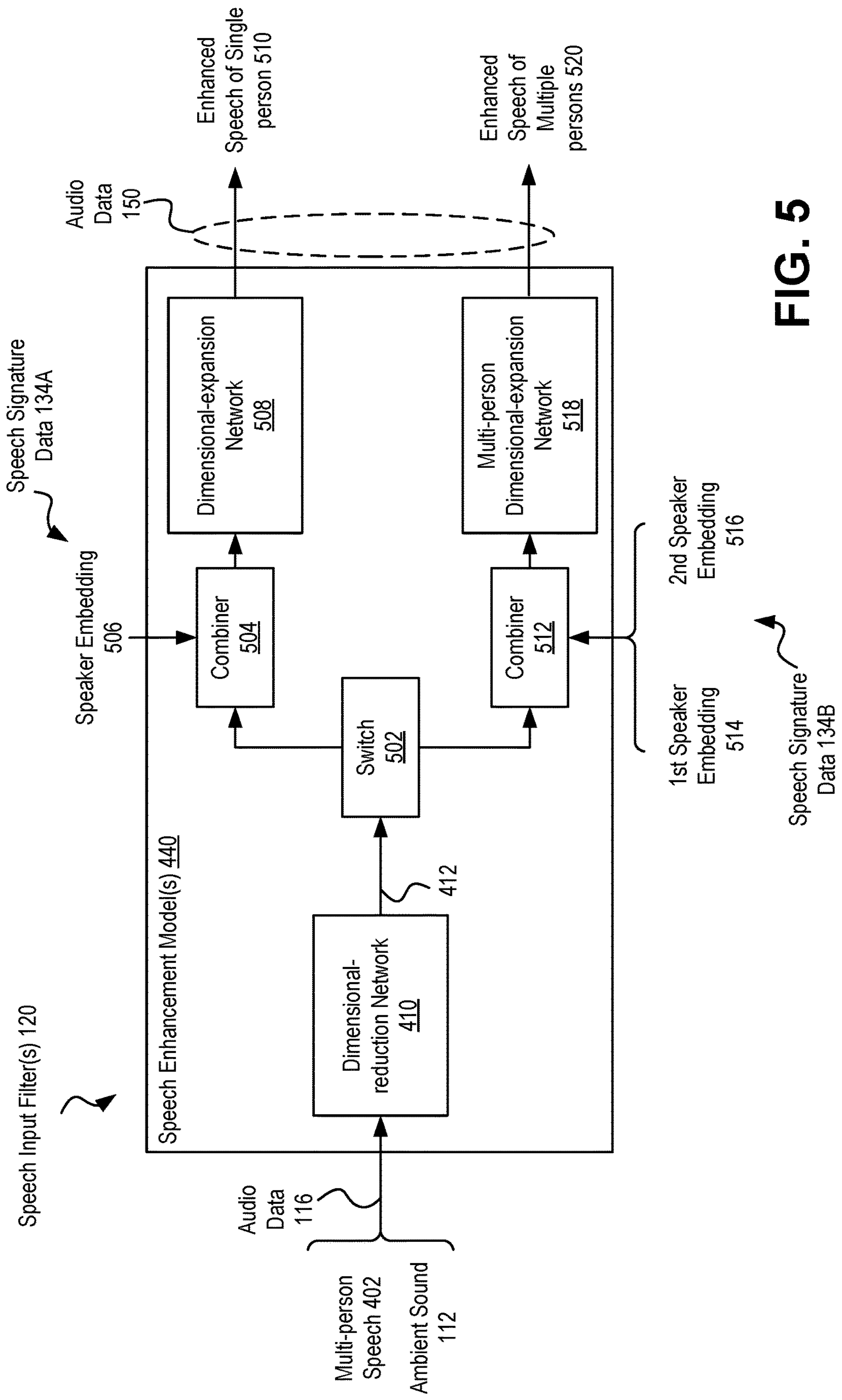
FIG. 5 is a diagram of an illustrative aspect of operations associated with speaker-specific speech filtering for multiple users, in accordance with some examples of the present disclosure.

FIG. 5 illustrates another specific example of the speech input filter(s) 120. In the example illustrated in FIG. 5, the speech input filter(s) 120 include or correspond to one or more speech enhancement models 440. As in FIG. 4, the speech enhancement model(s) 440 include one or more machine-learning models that are configured (and trained) to perform speech enhancement operations, such as denoising, speaker separation, etc. In the example illustrated in FIG. 5, the speech enhancement model(s) 440 include the dimensional-reduction network 410 coupled to a switch 502. The switch 502 can include, for example, a logical switch configured to select which of a plurality of subsequent processing paths is performed. The dimensional-reduction network 410 operates as described with reference to FIG. 4 to generate a latent-space representation 412 associated with each input feature vector of the audio data 116.

In the example illustrated in FIG. 5, the switch 502 is coupled to a first processing path that includes a combiner 504 and a dimensional-expansion network 508, and the switch 502 is also coupled to a second processing path that includes a combiner 512 and a multi-person dimensional-expansion network 518. In this example, the first processing path is configured (and trained) to perform operations associated with enhancing speech for a single person, and the second processing path is configured (and trained) to perform operations associated with enhancing speech for multiple persons. Thus, the switch 502 is configured to select the first processing path when the configuration data 132 of FIG. 1 includes a single speaker embedding 506 or otherwise indicates that speech of a single identified speaker is to be enhanced to generate enhanced speech of a single person 510. In contrast, the switch 502 is configured to select the second processing path when the configuration data 132 of FIG. 1 includes multiple speaker embeddings (such as a first speaker embedding 514 and a second speaker embedding 516) or otherwise indicates that speech of multiple identified speakers is to be enhanced to generate enhanced speech of multiple persons 520.

The combiner 504 is configured to combine the speaker embedding 506 and the latent-space representation 412 to generate a combined vector as input for the dimensional-expansion network 508. The dimensional-expansion network 508 is configured to process the combined vector, as described with reference to FIG. 4, to generate the enhanced speech of a single person 510.

The combiner 512 is configured to combine the two or more speaker embeddings (e.g., the first and second speaker embeddings 514, 516) and the latent-space representation 412 to generate a combined vector as input for the multi-person dimensional-expansion network 518. The multi-person dimensional-expansion network 518 is configured to process the combined vector, as described with reference to FIG. 4, to generate the enhanced speech of multiple persons 520. Although the first processing path and the second processing path perform similar operations, different processing paths are used in the example illustrated in FIG. 5 because the combined vectors that are generated by the combiners 504, 512 have different dimensionality. As a result, the dimensional-expansion network 508 and the multi-person dimensional-expansion network 518 have different architectures to accommodate the differently dimensioned combined vectors.

Alternatively, in some implementations, different processing paths are used in FIG. 5 to account for different operations performed by the combiners 504, 512. For example, the combiner 512 may be configured to combine the speaker embeddings 514, 516 in an element-by-element manner such that the combined vectors generated by the combiners 504, 512 have the same dimensionality. To illustrate, the combiner 512 may sum or average a value of each element of the first speaker embedding 514 with a value of a corresponding element of the second speaker embedding 516.

Figure 6:
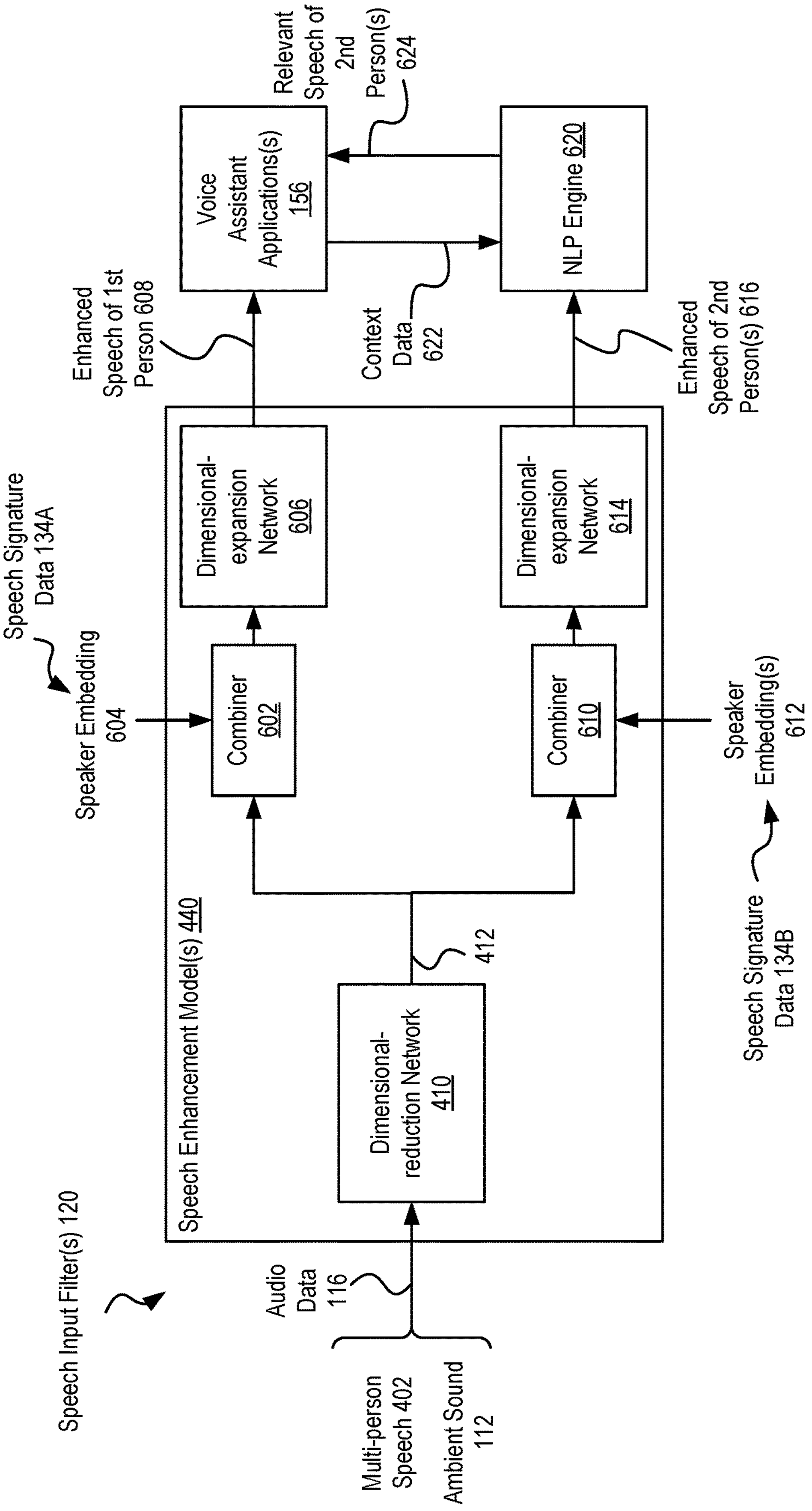
FIG. 6 is a diagram of an illustrative aspect of operations associated with speaker-specific speech filtering for multiple users, in accordance with some examples of the present disclosure.

FIG. 6 illustrates another specific example of the speech input filter(s) 120. In the example illustrated in FIG. 6, the speech input filter(s) 120 include or correspond to one or more speech enhancement models 440. As in FIGS. 4 and 5, the speech enhancement model(s) 440 include one or more machine-learning models that are configured (and trained) to perform speech enhancement operations, such as denoising, speaker separation, etc. In the example illustrated in FIG. 6, the speech enhancement model(s) 440 include the dimensional-reduction network 410, which operates as described with reference to FIG. 4 to generate a latent-space representation 412 associated with each input feature vector of the audio data 116.

In the example illustrated in FIG. 6, the dimensional-reduction network 410 is coupled to a first processing path that includes a combiner 602 and a dimensional-expansion network 606 and is coupled to a second processing path that includes a combiner 610 and a dimensional-expansion network 614. In this example, the first processing path is configured (and trained) to perform operations associated with enhancing speech of a first person (e.g., the person who initiated a particular voice assistant session), and the second processing path is configured (and trained) to perform operations associated with enhancing speech of one or more second persons (e.g., a person who, based on the configuration data 132 of FIG. 1, is approved to barge in to the voice assistant session under certain circumstances).

The combiner 602 is configured to combine a speaker embedding 604 (e.g., a speaker embedding associated with the person who spoke the wake word 110 to initiate the voice assistant session) and the latent-space representation 412 to generate a combined vector as input for the dimensional-expansion network 606. The dimensional-expansion network 606 is configured to process the combined vector, as described with reference to FIG. 4, to generate the enhanced speech of the first person 608. Since the first person is the one who initiated the voice assistant session, the enhanced speech of the first person 608 is provided to the voice assistant application(s) 156 for processing.

The combiner 610 is configured to combine a speaker embedding 612 (e.g., a speaker embedding associated with a second person who did not speak the wake word 110 to initiate the voice assistant session) and the latent-space representation 412 to generate a combined vector as input for the dimensional-expansion network 614. The dimensional-expansion network 614 is configured to process the combined vector, as described with reference to FIG. 4 (or FIG. 5 in the case where the speaker embedding(s) 612 correspond to multiple persons, collectively referred to as "the second person"), to generate the enhanced speech of the second person 616. Note that at any particular time, the latent-space representation 412 may include speech of the first person, speech of the second person, neither, or both. Accordingly, in some implementations, each latent-space representation 412 may be processed via both the first processing path and the second processing path.

The second person has conditional access to the voice assistant session. As such, the enhanced speech of the second person 616 is subjected to further analysis to determine whether conditions are satisfied to provide the speech of the second person 616 to the voice assistant application(s) 156. In the example illustrated in FIG. 6, the enhanced speech of the second person 616 is provided to a natural-language processing (NLP) engine 620. Additionally, context data 622 associated with the enhanced speech of the first person 608 is provided to the NLP engine 620. The context data 622 may include, for example, the enhanced speech of the first person 608, data summarizing the enhanced speech of the first person 608 (e.g., keywords from the enhanced speech of the first person 608), results generated by the voice assistant application(s) 156 responsive to the enhanced speech of the first person 608, other data indicative of the content of the enhanced speech of the first person 608, or any combination thereof.

The NLP engine 620 is configured to determine whether the speech of the second person (as represented in the enhanced speech of the second person 616) is contextually relevant to a voice assistant request, a command, an inquiry, or other content of the speech of the first person as indicated by the context data 622. As an example, the NLP engine 620 may perform context-aware semantic embedding of the context data 622, the enhanced speech of the second person 616, or both, to determine a value of a relevance metric associated with the enhanced speech of the second person 616. In this example, the context-aware semantic embedding may be used to map the enhanced speech of the second person 616 to a feature space in which semantic similarity can be estimated based on distance (e.g., cosine distance, Euclidean distance, etc.) between two points, and the relevance metric may correspond to a value of the distance metric. The content of the enhanced speech of the second person 616 may be considered to be relevant to the voice assistant session if the relevance metric satisfies a threshold.

If the content of the enhanced speech of the second person 616 is considered to be relevant to the voice assistant session, the NLP engine 620 provides relevant speech of the second person 624 to the voice assistant application(s) 156. Otherwise, if the content of the enhanced speech of the second person 616 is not considered to be relevant to the voice assistant session, the enhanced speech of the second person 616 is discarded or ignored.

Figure 7:
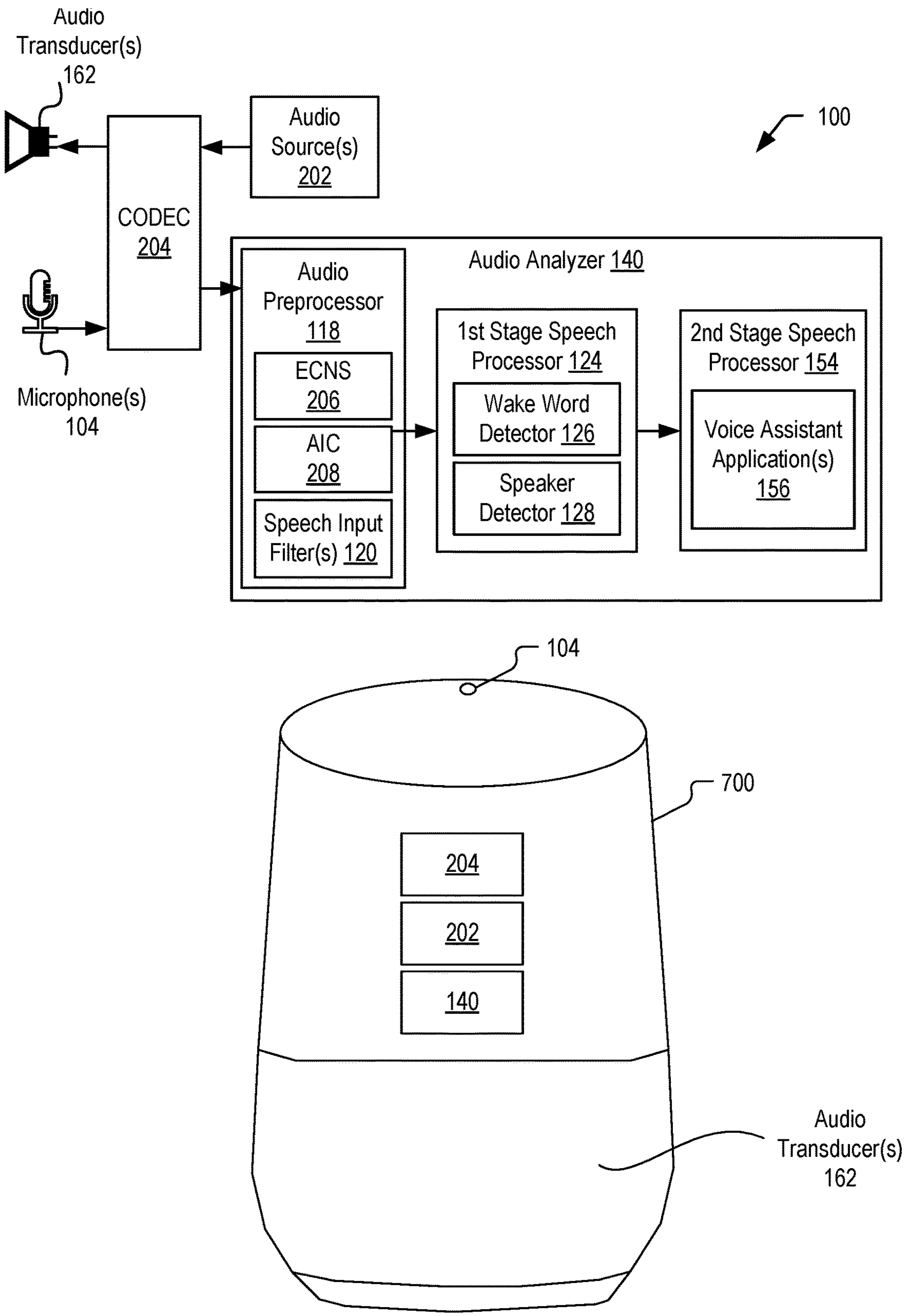
FIG. 7 is a diagram of a voice-controlled speaker system operable to perform speaker-specific speech filtering for multiple users, in accordance with some examples of the present disclosure.

FIG. 7 is an implementation in which the system 100 is integrated within a wireless speaker and voice activated device 700. The wireless speaker and voice activated device 700 can have wireless network connectivity and is configured to execute voice assistant operations. In FIG. 7, the audio analyzer 140, the audio source(s) 202, and the CODEC 204 are included in the wireless speaker and voice activated device 700. The wireless speaker and voice activated device 700 also includes the audio transducer(s) 164 and the microphone(s) 104.

During operation, one or more of the microphone(s) 104 may detect sounds within the vicinity of the wireless speaker and voice activated device 700, such as in a room in which the wireless speaker and voice activated device 700 is disposed. The microphone(s) 104 provide audio data representing the sounds to the audio analyzer 140. When no voice assistant session is in progress, the ECNS unit 206, the AIC 208, or both, process the audio data to generate filtered audio data (e.g., the filtered audio data 122) and provide the filtered audio data to the wake word detector 126. If the wake word detector 126 detects a wake word (e.g., the wake word 110 of FIG. 1) in the filtered audio data, the wake word detector 126 signals the speaker detector 128 to identify a person who spoke the wake word. Additionally, the wake word detector 126 activates the second stage speech processor 154 to initiate a voice assistant session. The speaker detector 128 provides an identifier of the person who spoke the wake word (e.g., the speaker identifier(s) 130) to the audio preprocessor 118, and the audio preprocessor 118 obtains configuration data (e.g., the configuration data 132) to activate the speech input filter(s) 120 as a speaker-specific speech input filter. The above-described process can be repeated for each distinct person that speaks a wake word, enabling multiple concurrent voice assistant sessions to be performed for multiple users. In some implementations, the wake word detector 126 may also provide information to the AIC 208 to indicate a direction, location, or audio zone from which each detected wake word originated, and the AIC 208 may perform beamforming or other directional audio processing to filter audio data provided to the speech input filter(s) 120 based on the direction, location, or audio zone from which each person's speech originated.

The speaker-specific speech input filter is used to filter the audio data and to provide the filtered audio data to respective instance(s) of the voice assistant application(s) 156, as described with reference to any of FIGS. 1-6. Based on content of speech represented in the filtered audio data, the voice assistant application(s) 156 perform one or more voice assistant operations, such as sending commands to smart home devices, playing out media, or perform other operations, such as retrieving information from a remote data source. A response (e.g., the voice assistant response 170) from the voice assistant application(s) 156 may be played out via the audio transducer(s) 164.

Selective operation of the speech input filter(s) 120 as speaker-specific speech input filters enables more accurate speech recognition by the voice assistant application(s) 156 since noise and irrelevant speech is removed from the audio data provided to each instance of the voice assistant application(s) 156. Additionally, the selective operation of the speech input filter(s) 120 as speaker-specific speech input filters limits the ability of multiple persons in the room engaging in respective voice assistant sessions with the wireless speaker and voice activated device 700 to barge in to each other's voice assistant sessions.

Figure 8:
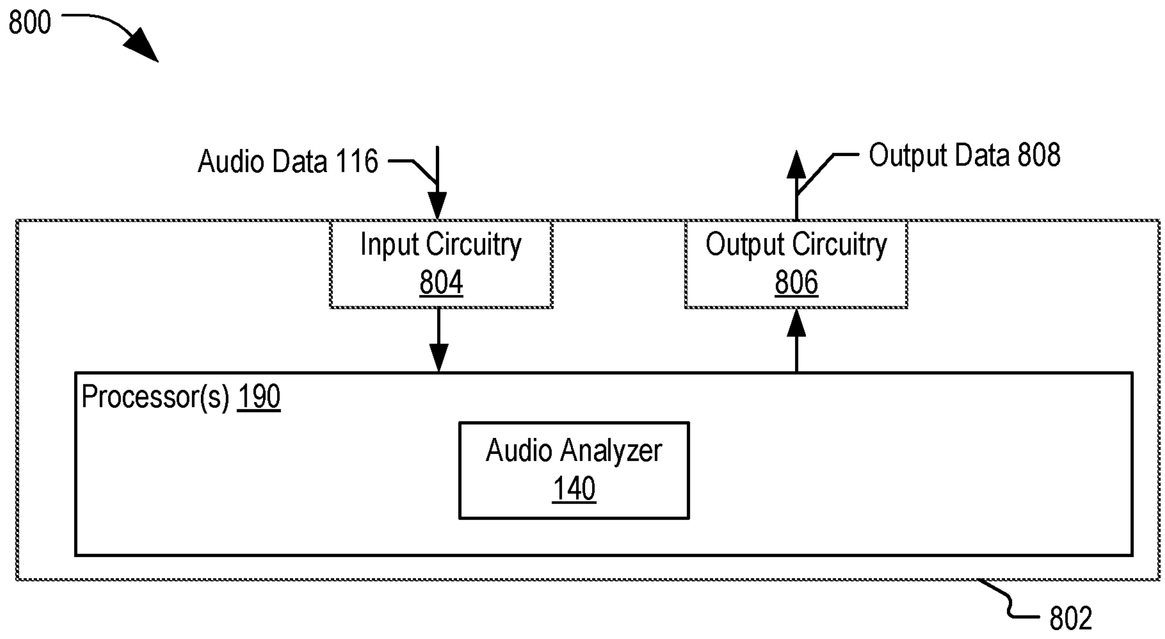
FIG. 8 illustrates an example of an integrated circuit operable to perform speaker-specific speech filtering for multiple users, in accordance with some examples of the present disclosure.

FIG. 8 depicts an implementation 800 of the device 102 as an integrated circuit 802 that includes the one or more processor(s) 190, which include one or more components of the audio analyzer 140. The integrated circuit 802 also includes input circuitry 804, such as one or more bus interfaces, to enable the audio data 116 to be received for processing. The integrated circuit 802 also includes output circuitry 806, such as a bus interface, to enable sending of output data 808 from the integrated circuit 802. For example, the output data 808 may include the voice assistant response 170 of FIG. 1. As another example, the output data 808 may include commands to other devices (such as media players, vehicle systems, smart home devices, etc.) or queries (such as information retrieval queries sent to remote devices). In some implementations, the voice assistant application(s) 156 of FIG. 1 are located remoted from the audio analyzer 140 of FIG. 8, in which case the output data 808 may include the audio data 150 of FIG. 1.

Figure 9:
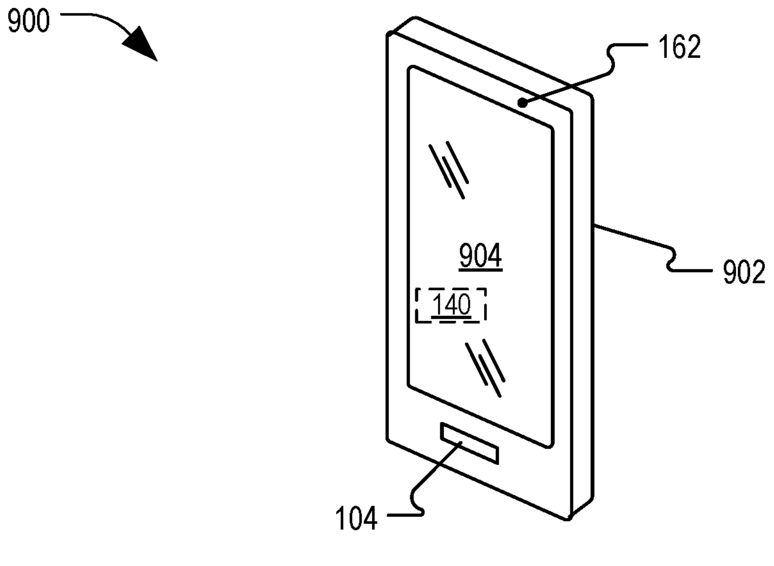
FIG. 9 is a diagram of a mobile device operable to perform speaker-specific speech filtering for multiple users, in accordance with some examples of the present disclosure.
Figure 10:
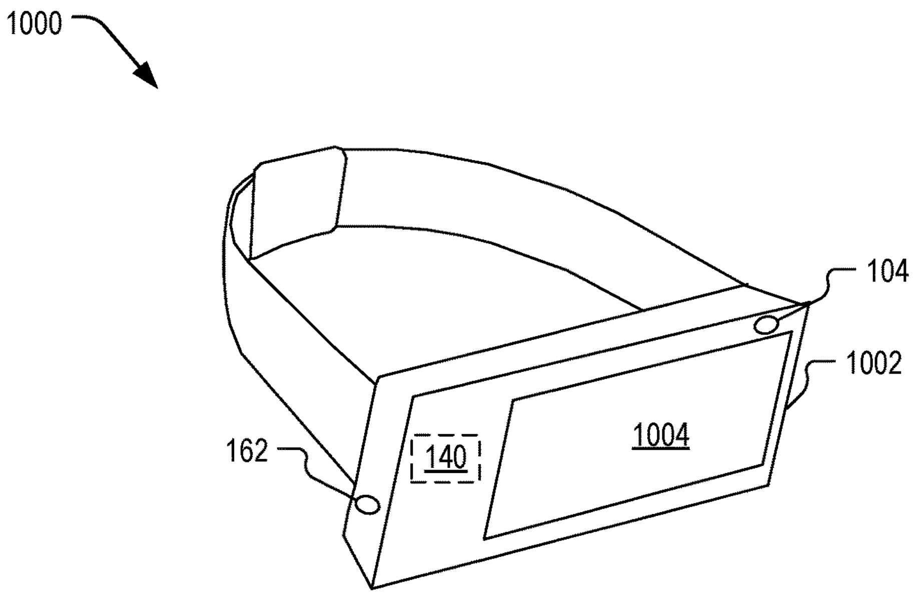
FIG. 10 is a diagram of a wearable electronic device operable to perform speaker-specific speech filtering for multiple users, in accordance with some examples of the present disclosure.
Figure 11:
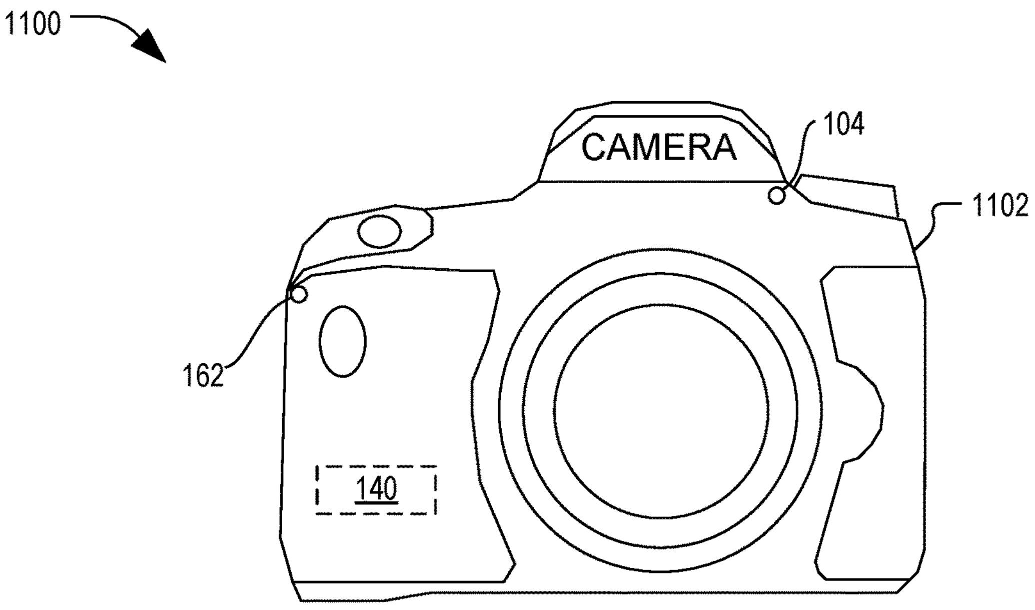
FIG. 11 is a diagram of a camera operable to perform speaker-specific speech filtering for multiple users, in accordance with some examples of the present disclosure.
Figure 12:
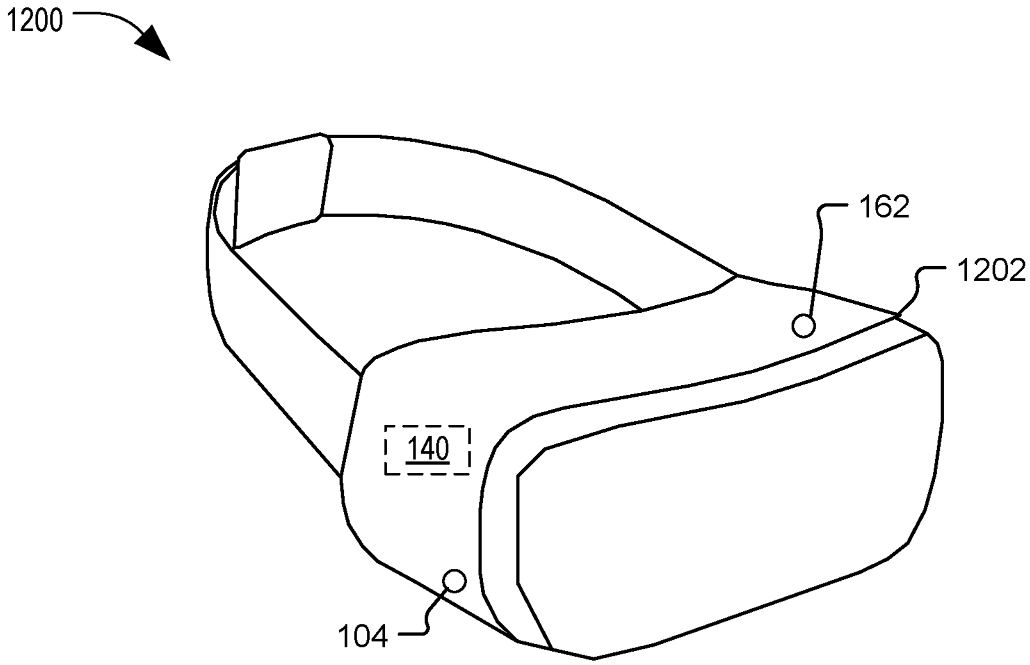
FIG. 12 is a diagram of a headset, such as a virtual reality, mixed reality, or augmented reality headset, operable to perform speaker-specific speech filtering for multiple users, in accordance with some examples of the present disclosure.
Figure 13:
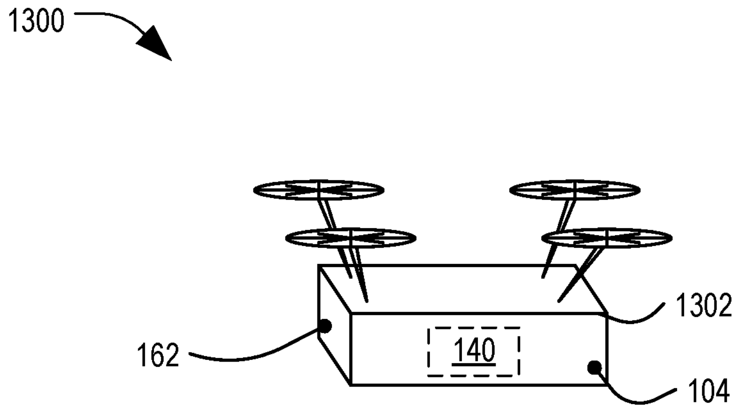
FIG. 13 is a diagram of a second example of a vehicle operable to perform speaker-specific speech filtering for multiple users, in accordance with some examples of the present disclosure.

The integrated circuit 802 enables implementation of speaker-specific speech filtering for multiple users as a component in a system that includes microphones, such as a mobile phone or tablet as depicted in FIG. 9, a wearable electronic device as depicted in FIG. 10, a camera as depicted in FIG. 11, an extended reality (e.g., a virtual reality, mixed reality, or augmented reality) headset as depicted in FIG. 12, or a vehicle as depicted in FIG. 2 or FIG. 13.

FIG. 9 depicts an implementation 900 in which the device 102 includes a mobile device 902, such as a phone or tablet, as illustrative, non-limiting examples. In a particular implementation, the integrated circuit 802 is integrated within the mobile device 902. In FIG. 9, the mobile device 902 includes the microphone(s) 104, the audio transducer(s) 164, and a display screen 904. Components of the processor(s) 190, including the audio analyzer 140, are integrated in the mobile device 902 and are illustrated using dashed lines to indicate internal components that are not generally visible to a user of the mobile device 902.

In a particular example, the audio analyzer 140 of FIG. 9 operates as described with reference to any of FIGS. 1-8 to selectively enable speaker-specific speech filtering for multiple users in a manner that improves the accuracy of speech recognition by the voice assistant application(s) 156 and limits the ability of other persons to interrupt a voice assistant session. During a voice assistant session, a response from a voice assistant application may be provided as output to a user via the audio transducer(s) 164, via the display screen 904, or both.

FIG. 10 depicts an implementation 1000 in which the device 102 includes a wearable electronic device 1002, illustrated as a "smart watch." In a particular implementation, the integrated circuit 802 is integrated within the wearable electronic device 1002. In FIG. 10, the wearable electronic device 1002 includes the microphone(s) 104, the audio transducer(s) 164, and a display screen 1004.

Components of the processor(s) 190, including the audio analyzer 140, are integrated in the wearable electronic device 1002. In a particular example, the audio analyzer 140 of FIG. 10 operates as described with reference to any of FIGS. 1-8 to selectively enable speaker-specific speech filtering for multiple users in a manner that improves the accuracy of speech recognition by the voice assistant application(s) 156 and limits the ability of other persons to interrupt a voice assistant session. During a voice assistant session, a response from a voice assistant application may be provided as output to a user via the audio transducer(s) 164, via haptic feedback to the user, via the display screen 1004, or any combination thereof.

As one example of operation of the wearable electronic device 1002, during a voice assistant session, a person who initiates the voice assistant session may provide speech requesting that messages (e.g., text message, email, etc.) sent to the person be displayed via the display screen 1004 of the wearable electronic device 1002. In this example, other persons in the vicinity of the wearable electronic device 1002 may speak a wake word associated with the audio analyzer 140 and may initiate new voice assistant sessions (if permitted) without interrupting the voice assistant session because audio data is filtered during the voice assistant session to de-emphasize a portion of the audio data that does not correspond to speech of the person who initiated the voice assistant session.

FIG. 11 depicts an implementation 1100 in which the device 102 includes a portable electronic device that corresponds to a camera device 1102. In a particular implementation, the integrated circuit 802 is integrated within the camera device 1102. In FIG. 11, the camera device 1102 includes the microphone(s) 104 and the audio transducer(s) 164. The camera device 1102 may also include a display screen on a side not illustrated in FIG. 11.

Components of the processor(s) 190, including the audio analyzer 140, are integrated in the camera device 1102. In a particular example, the audio analyzer 140 of FIG. 11 operates as described with reference to any of FIGS. 1-8 to selectively enable speaker-specific speech filtering for multiple users in a manner that improves the accuracy of speech recognition by the voice assistant application(s) 156 and limits the ability of other persons to interrupt a voice assistant session. During a voice assistant session, a response from a voice assistant application may be provided as output to a user via the audio transducer(s) 164, via the display screen, or both.

As one example of operation of the camera device 1102, during a voice assistant session, a person who initiates the voice assistant session may provide speech requesting that the camera device 1102 capture an image. In this example, other persons in the vicinity of the camera device 1102 may speak a wake word associated with the audio analyzer 140 and may initiate new voice assistant sessions (if permitted) without interrupting the voice assistant session because audio data is filtered during the voice assistant session to de-emphasize a portion of the audio data that does not correspond to speech of the person who initiated the voice assistant session.

FIG. 12 depicts an implementation 1200 in which the device 102 includes a portable electronic device that corresponds to an extended reality (e.g., a virtual reality, mixed reality, or augmented reality) headset 1202. In a particular implementation, the integrated circuit 802 is integrated within the headset 1202. In FIG. 12, the headset 1202 includes the microphone(s) 104 and the audio transducer(s) 164. Additionally, a visual interface device is positioned in front of the user's eyes to enable display of augmented reality, mixed reality, or virtual reality images or scenes to the user while the headset 1202 is worn.

Components of the processor(s) 190, including the audio analyzer 140, are integrated in the headset 1202. In a particular example, the audio analyzer 140 of FIG. 12 operates as described with reference to any of FIGS. 1-8 to selectively enable speaker-specific speech filtering for multiple users in a manner that improves the accuracy of speech recognition by the voice assistant application(s) 156 and limits the ability of other persons to interrupt a voice assistant session. During a voice assistant session, a response from a voice assistant application may be provided as output to a user via the audio transducer(s) 164, via the visual interface device, or both.

As one example of operation of the headset 1202, during a voice assistant session, a person who initiates the voice assistant session may provide speech requesting that particular media be displayed on the visual interface device of the headset 1202. In this example, other persons in the vicinity of the headset 1202 may speak a wake word associated with the audio analyzer 140 and may initiate new voice assistant sessions (if permitted) without interrupting the voice assistant session because audio data is filtered during the voice assistant session to de-emphasize a portion of the audio data that does not correspond to speech of the person who initiated the voice assistant session.

FIG. 13 depicts an implementation 1300 in which the device 102 corresponds to, or is integrated within, a vehicle 1302, illustrated as a manned or unmanned aerial device (e.g., a package delivery drone). In a particular implementation, the integrated circuit 802 is integrated within the vehicle 1302. In FIG. 13, the vehicle 1302 also includes the microphone(s) 104 and the audio transducer(s) 164.

Components of the processor(s) 190, including the audio analyzer 140, are integrated in the vehicle 1302. In a particular example, the audio analyzer 140 of FIG. 13 operates as described with reference to any of FIGS. 1-8 to selectively enable speaker-specific speech filtering for multiple users in a manner that improves the accuracy of speech recognition by the voice assistant application(s) 156 and limits the ability of other persons to interrupt a voice assistant session. During a voice assistant session, a response from a voice assistant application may be provided as output to a user via the audio transducer(s) 164.

As one example of operation of the vehicle 1302, during a voice assistant session, a person who initiates the voice assistant session may provide speech requesting that the vehicle 1302 deliver a package to a specified location. In this example, other persons in the vicinity of the vehicle 1302 may speak a wake word associated with the audio analyzer 140 and may initiate new voice assistant sessions (if permitted) without interrupting the voice assistant session because audio data is filtered during the voice assistant session to de-emphasize a portion of the audio data that does not correspond to speech of the person who initiated the voice assistant session. As a result, the other persons are unable to redirect the vehicle 1302 to a different delivery location.

Figure 14:
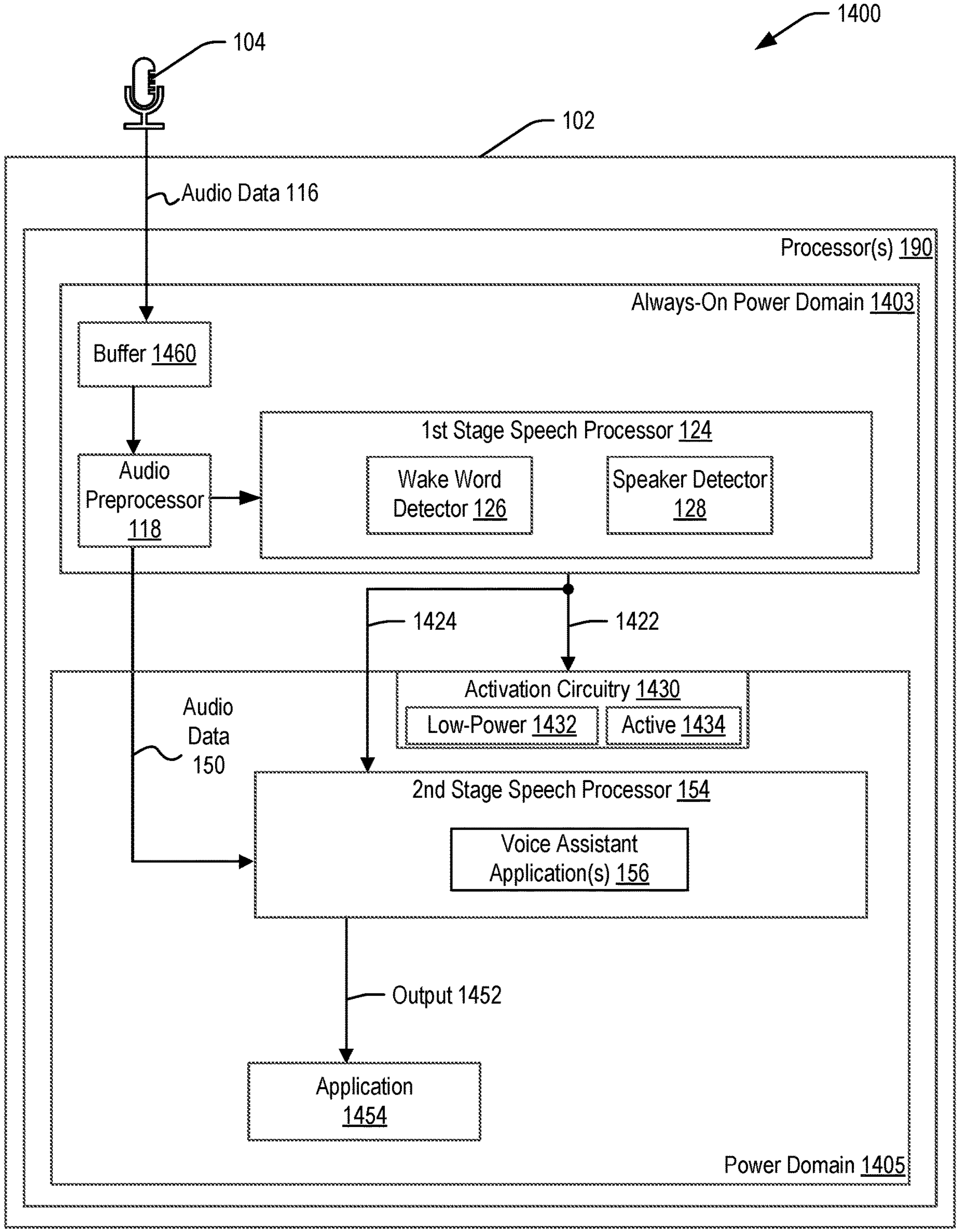
FIG. 14 is a diagram of an illustrative aspect of operation of components of the system of FIG. 1, in accordance with some examples of the present disclosure.

FIG. 14 is a block diagram of an illustrative aspect of a system 1400 operable to perform speaker-specific speech filtering for multiple users, in accordance with some examples of the present disclosure. In FIG. 14, the processor 190 includes an always-on power domain 1403 and a second power domain 1405, such as an on-demand power domain. Operation of the system 1400 is divided such that some operations are performed in the always-on power domain 1403 and other operations are performed in the second power domain 1405. For example, in FIG. 14, the audio preprocessor 118, the first stage speech processor 124, and a buffer 1460 are included in the always-on power domain 1403 and configured to operate in an always-on mode. Additionally, in FIG. 14, the second stage speech processor 154 is included in the second power domain 1405 and configured to operate in an on-demand mode. The second power domain 1405 also includes activation circuitry 1430.

The audio data 116 received from the microphone(s) 104 is stored in the buffer 1460. In a particular implementation, the buffer 1460 is a circular buffer that stores the audio data 116 such that the most recent audio data 116 is accessible for processing by other components, such as the audio preprocessor 118, the first stage speech processor 124, the second stage speech processor 154, or a combination thereof.

One or more components of the always-on power domain 1403 are configured to generate at least one of a wakeup signal 1422 or an interrupt 1424 to initiate one or more operations at the second power domain 1405. In an example, the wakeup signal 1422 is configured to transition the second power domain 1405 from a low-power mode 1432 to an active mode 1434 to activate one or more components of the second power domain 1405. As one example, the wake word detector 126 may generate the wakeup signal 1422 or the interrupt 1424 when a wake word is detected in the audio data 116.

In various implementations, the activation circuitry 1430 includes or is coupled to power management circuitry, clock circuitry, head switch or foot switch circuitry, buffer control circuitry, or any combination thereof. The activation circuitry 1430 may be configured to initiate powering-on of the second power domain 1405, such as by selectively applying or raising a voltage of a power supply of the second power domain 1405. As another example, the activation circuitry 1430 may be configured to selectively gate or un-gate a clock signal to the second power domain 1405, such as to prevent or enable circuit operation without removing a power supply.

An output 1452 generated by the second stage speech processor 154 may be provided to an application 1454. The application 1454 may be configured to perform operations as directed by one or more instances of the voice assistant application(s) 156. To illustrate, the application 1454 may correspond to a vehicle navigation and entertainment application, or a home automation system, as illustrative, non-limiting examples.

In a particular implementation, the second power domain 1405 may be activated when a voice assistant session is active. As one example of operation of the system 1400, the audio preprocessor 118 operates in the always-on power domain 1403 to filter the audio data 116 accessed from the buffer 1460 and provide the filtered audio data to the first stage speech processor 124. In this example, when no voice assistant session is active, the audio preprocessor 118 operates in a non-speaker-specific manner, such as by performing echo cancellation, noise suppression, etc.

When the wake word detector 126 detects a wake word in the filtered audio data from the audio preprocessor 118, the first stage speech processor 124 causes the speaker detector 128 to identify a person who spoke the wake word, sends the wakeup signal 1422 or the interrupt 1424 to the second power domain 1405, and causes the audio preprocessor 118 to obtain configuration data associated with the person who spoke the wake word.

Based on the configuration data, the audio preprocessor 118 begins operating in a speaker-specific mode for processing the speech of the person that spoke the wake word, as described with reference to any of FIGS. 1-6. In the speaker-specific mode, the audio preprocessor 118 provides the speech output signal 152 corresponding to the speech of the person that spoke the wake word to the second stage speech processor 154. The speech output signal 152 is filtered, by the speaker-specific speech input filter, to de-emphasize, attenuate, or remove portions of the audio data 116 that do not correspond to speech of specific person(s) whose speech signature data are provided to the audio preprocessor 118 with the configuration data. In some implementations, the audio preprocessor 118 also provides the speech output signal 152 to the first stage speech processor 124 until the voice assistant session is terminated.

By selectively activating the second stage speech processor 154 based on a result of processing audio data at the first stage speech processor 124, overall power consumption associated with speech processing may be reduced.

Figure 15:
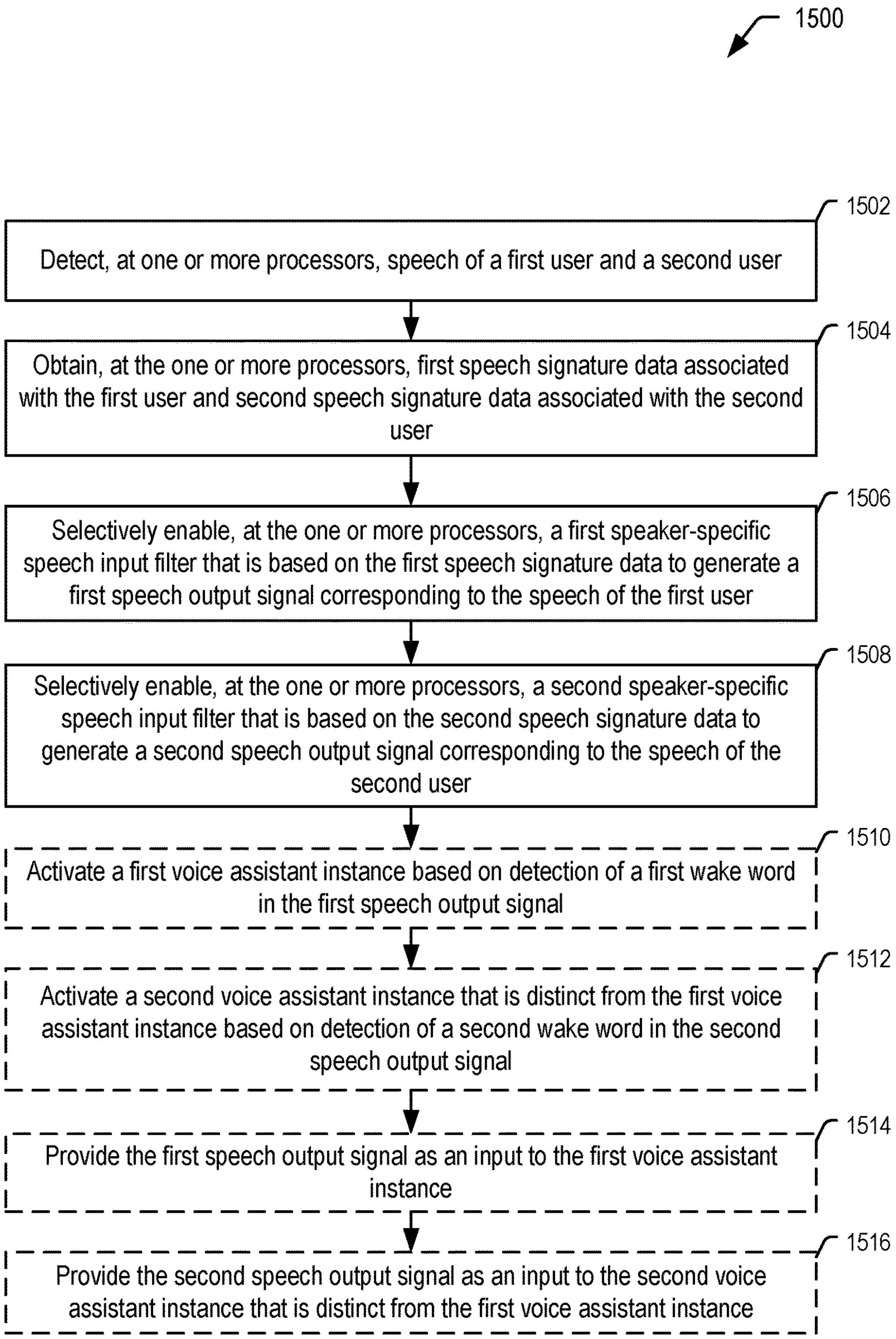
FIG. 15 is a diagram of a particular implementation of a method of speaker-specific speech filtering for multiple users that may be performed by the device of FIG. 1, in accordance with some examples of the present disclosure.

Referring to FIG. 15, a particular implementation of a method 1500 of speaker-specific speech filtering for multiple users is shown. In a particular aspect, one or more operations of the method 1500 are performed by at least one of the audio analyzer 140, the processor 190, the device 102, the system 100 of FIG. 1, or a combination thereof.

The method 1500 includes, at block 1502, detecting, at one or more processors, speech of a first user and a second user. For example, the audio analyzer 140 may detect, at the speaker detector 128, speech of the person 180A based on processing a portion of the audio data 116 corresponding to the utterance 108A from the person 180A to determine a speech signature and comparing the speech signature to the speech signature data 134. The audio analyzer 140 may also detect, at the speaker detector 128, speech of the person 180B based on processing a portion of the audio data 116 corresponding to the utterance 108B from the person 180B to determine a speech signature and comparing the speech signature to the speech signature data 134.

The method 1500 includes, at block 1504, obtaining, at the one or more processors, first speech signature data associated with the first user and second speech signature data associated with the second user. For example, the audio preprocessor 118 may obtain the configuration data 132 of FIG. 1 including at least the speech signature data 134A associated with the person 180A. The audio preprocessor 118 may also obtain the configuration data 132 of FIG. 1 including at least the speech signature data 134B associated with the person 180B.

The method 1500 includes, at block 1506, selectively enabling, at the one or more processors, a first speaker-specific speech input filter that is based on the first speech signature data to generate a first speech output signal corresponding to the speech of the first user. For example, the configuration data 132 of FIG. 1 including the speech signature data 134A enables the speech input filter 120A of the audio preprocessor 118 to operate in a speaker-specific mode to enhance the speech of the first person 180A, to attenuate sounds other than the speech of the first person 180A, such as attenuating speech of the second person 180B, or both. The first speech signature data can correspond to a first speaker embedding, such as a speaker embedding 414, and enabling the first speaker-specific speech input filter can include providing the first speaker embedding as an input to a speech enhancement model, such as the speech enhancement model 440 of FIGS. 4-6.

The method 1500 includes, at block 1508, selectively enabling, at the one or more processors, a second speaker-specific speech input filter that is based on the second speech signature data to generate a second speech output signal corresponding to the speech of the second user. For example, the configuration data 132 of FIG. 1 including the speech signature data 134B enables the speech input filter 120B of the audio preprocessor 118 to operate in a speaker-specific mode to enhance the speech of the second person 180B, to attenuate sounds other than the speech of the second person 180B, such as attenuating speech of the first person 180A, or both.

The method 1500 optionally includes, at block 1510, activating a first voice assistant instance based on detection of a first wake word in the first speech output signal and, at block 1512, activating a second voice assistant instance that is distinct from the first voice assistant instance based on detection of a second wake word in the second speech output signal. For example, the audio analyzer 140 may activate the first voice assistant instance 158A based on detection of the wake word 110A in the speech output signal 152A and may activate the second voice assistant instance 158B based on detection of the wake word 110B in the speech output signal 152B.

The method 1500 optionally includes, at block 1514, providing the first speech output signal as an input to the first voice assistant instance and, at block 1516, providing the second speech output signal as an input to the second voice assistant instance that is distinct from the first voice assistant instance. For example, the audio analyzer 140 may provide the speech output signal 152A to the first voice assistant instance 158A and provide the speech output signal 152B to the second voice assistant instance 158B.

According to an aspect, generation of the first speech output signal using the first speaker-specific speech input filter substantially prevents the speech of the second user from interfering with a voice assistant session of the first user. In some implementations, the speech of the first user and the speech of the second user overlap in time, wherein the first speaker-specific speech input filter suppresses the speech of the second user during generation of the first speech output signal, and the second speaker-specific speech input filter suppresses the speech of the first user during generation of the second speech output signal.

One benefit of selectively enabling speaker-specific filtering of audio data for multiple users is that such filtering can improve accuracy of speech recognition of each of the multiple users by a voice assistant application. Another benefit of selectively enabling speaker-specific filtering of audio data for multiple users is that such filtering can limit the ability of the users to interrupt voice assistant sessions that they have not initiated, thus enabling multiple voice assistant sessions to be conducted simultaneously with the speech of each user having minimal or no effect on the other users' voice assistant sessions.

The method 1500 of FIG. 15 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1500 of FIG. 15 may be performed by a processor that executes instructions, such as described with reference to FIG. 18.

Figure 16:
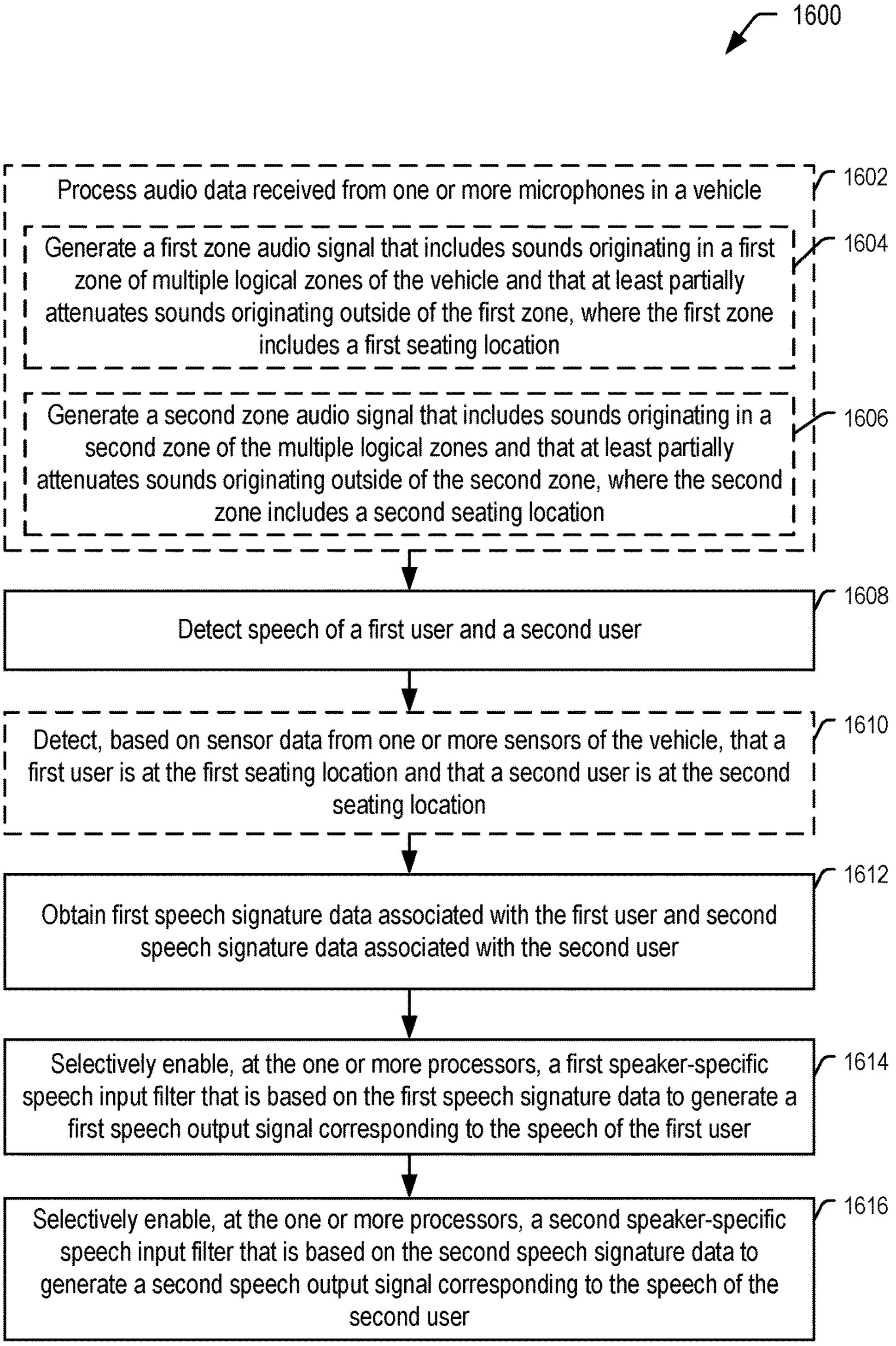
FIG. 16 is a diagram of a particular implementation of a method of speaker-specific speech filtering for multiple users that may be performed by the device of FIG. 1, in accordance with some examples of the present disclosure.

Referring to FIG. 16, a particular implementation of a method 1600 of speaker-specific speech filtering for multiple users is shown. In a particular aspect, one or more operations of the method 1600 are performed by at least one of the audio analyzer 140, the processor 190, the device 102, the system 100 of FIG. 1, the vehicle 250 of FIG. 2, or a combination thereof.

The method 1600 optionally includes, at block 1602, processing audio data received from one or more microphones in a vehicle. Processing the audio data optionally includes, at block 1604, generating a first zone audio signal that includes sounds originating in a first zone of multiple logical zones of the vehicle and that at least partially attenuates sounds originating outside of the first zone, where the first zone includes a first seating location. Processing the audio data optionally also includes, at block 1606, generating a second zone audio signal that includes sounds originating in a second zone of the multiple logical zones and that at least partially attenuates sounds originating outside of the second zone, where the second zone includes the second seating location. For example, the audio preprocessor 118 of FIG. 2 processes audio data from the microphones 104 of the vehicle 250 to generate a distinct zone audio signal 260 for each zone 254 in which sound is detected. To illustrate, the AIC 208 processes the received audio data to attenuate or remove, for each of the zone audio signals 260, sounds originating from outside of that zone.

The method 1600 includes, at block 1608, detecting speech of a first user and a second user. For example, the audio analyzer 140 may, using the speaker detector 128, detect speech of the person 180A based on processing a portion of the audio data 116 corresponding to the utterance 108A from the person 180A to determine a speech signature and comparing the speech signature to the speech signature data 134. The audio analyzer 140 may also detect speech of the person 180B based on processing a portion of the audio data 116 corresponding to the utterance 108B from the person 180B to determine a speech signature and comparing the speech signature to the speech signature data 134.

The method 1600 optionally includes, at block 1610, detecting, based on sensor data from one or more sensors of the vehicle, that the first user is at the first seating location and that the second user is at the second seating location. For example, the sensor data can correspond to the audio data 116 from the microphones 104, image data from one or more cameras, data from one or more weight sensors of the seats 252, or one or more other types of sensor data that is used to determine which user is at which seating location. To illustrate, the sensor data may indicate that the first person 180A is in the first seat 252A corresponding to the first zone 254A and that the second person 180B is in the second seat 252B corresponding to the second zone 254B.

The method 1600 includes, at block 1612, obtaining, at the one or more processors, first speech signature data associated with the first user and second speech signature data associated with the second user. For example, the audio preprocessor 118 may obtain the configuration data 132 of FIG. 1 including at least the speech signature data 134A associated with the person 180A. The audio preprocessor 118 may also obtain the configuration data 132 of FIG. 1 including at least the speech signature data 134B associated with the person 180B.

The method 1600 includes, at block 1614, selectively enabling, at the one or more processors, a first speaker-specific speech input filter that is based on the first speech signature data to generate a first speech output signal corresponding to the speech of the first user. For example, the configuration data 132 of FIG. 1 including the speech signature data 134A enables the speech input filter 120A of the audio preprocessor 118 to operate in a speaker-specific mode when processing the first zone audio signal 260A to enhance the speech of the first person 180A, to attenuate sounds other than the speech of the first person 180A, such as attenuating speech of the second person 180B, or both, during generation of the first speech output signal 152A.

The method 1600 includes, at block 1616, selectively enabling, at the one or more processors, a second speaker-specific speech input filter that is based on the second speech signature data to generate a second speech output signal corresponding to the speech of the second user. For example, the configuration data 132 of FIG. 1 including the speech signature data 134B enables the speech input filter 120B of the audio preprocessor 118 to operate in a speaker-specific mode when processing the second zone audio signal 260B to enhance the speech of the second person 180B, to attenuate sounds other than the speech of the second person 180B, such as attenuating speech of the first person 180A, or both.

One benefit of selectively enabling speaker-specific filtering of audio data is that such filtering can improve accuracy of speech recognition by a voice assistant application. Another benefit of selectively enabling speaker-specific filtering of audio data is that such filtering can limit the ability of other persons to interrupt a voice assistant session, such as to enable multiple occupants of a vehicle to simultaneously engage in voice assistant sessions without substantially interfering with the other occupants' voice assistant sessions.

The method 1600 of FIG. 16 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1600 of FIG. 16 may be performed by a processor that executes instructions, such as described with reference to FIG. 18.

Figure 17:
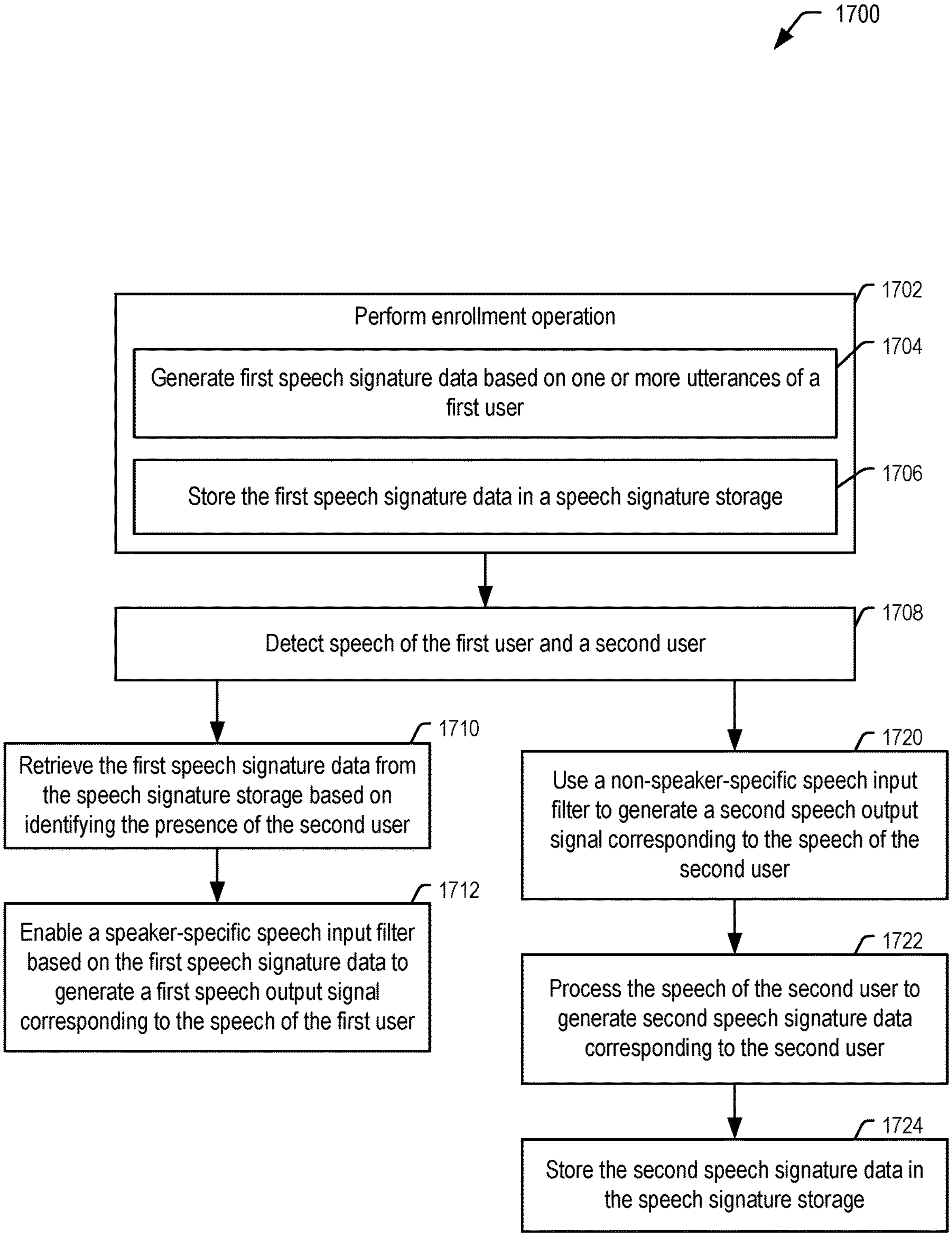
FIG. 17 is a diagram of a particular implementation of a method of speaker-specific speech filtering for multiple users that may be performed by the device of FIG. 1, in accordance with some examples of the present disclosure.

Referring to FIG. 17, a particular implementation of a method 1700 of speaker-specific speech filtering for multiple users is shown. In a particular aspect, one or more operations of the method 1700 are performed by at least one of the audio analyzer 140, the processor 190, the device 102, the system 100 of FIG. 1, or a combination thereof.

The method 1700 includes, at block 1702, performing an enrollment operation to enroll a first user. The enrollment operation includes, at block 1704, generating first speech signature data based on one or more utterances of the first user. For example, the first user may be instructed to recite multiple words or phrases that are captured by the microphone(s) 104 and processed to determine the first speech signature data, such as a speaker embedding 414 for the first user. The enrollment operation also includes, at block 1706, storing the first speech signature data in a speech signature storage. For example, the processor 190 can store the speech signature data 134A in the memory 142 as part of the stored enrollment data 136.

The method 1700 includes, after the enrollment operation, detecting speech of the first user and a second user, at block 1708, and retrieving the first speech signature data from the speech signature storage based on identifying a presence of the first user, at block 1710. For example, the speech of the first user and the second user can be detected via operation of the speaker detector 128 operating on the filtered audio data 122, and the speech signature data 134A can be included in the configuration data 132 that is provided to the audio preprocessor 118 in response to detecting the speech of the first user.

The method 1700 includes, at block 1712, enabling a speaker-specific speech input filter based on the first speech signature data to generate a first speech output signal corresponding to the speech of the first user. For example, the audio analyzer 140 activates the speech input filter 120A to operate as a speaker-specific speech input filter to generate the speech output signal 152A including speech of the first user.

The method 1700 also includes, at block 1720, using a non-speaker-specific speech input filter to generate a second speech output signal corresponding to the speech of the second user. For example, when the audio analyzer 140 determines that none of the speech signature data 134 in the enrollment data 136 matches a signature generated based on the second user's speech, the speech input filter 120B can provide speech enhancement that is not specific to the second user.

The method 1700 includes, at block 1722, processing the speech of the second user to generate second speech signature data corresponding to the second user. For example, the processor 190 may store samples of the speech of the second user and use the stored samples to train a machine learning model to generate a speaker embedding 414 as the speech signature data 134B corresponding to the second user. The processor 190 may periodically or occasionally update the speech signature data 134B for the second user to more accurately enable the speech input filter 120B to perform speaker-specific filtering for the speech of the second user as more samples of the second user's speech are obtained by the processor 190.

The method 1700 includes, at block 1724, storing the second speech signature data in the speech signature storage. For example, the processor 190 may store the speech signature data 134B as part of the enrollment data 136 in the memory 142 to be available for retrieval the next time the second user uses the device 102 (e.g., travels in the vehicle 250).

The method 1700 of FIG. 17 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1700 of FIG. 17 may be performed by a processor that executes instructions, such as described with reference to FIG. 18.

Figure 18:
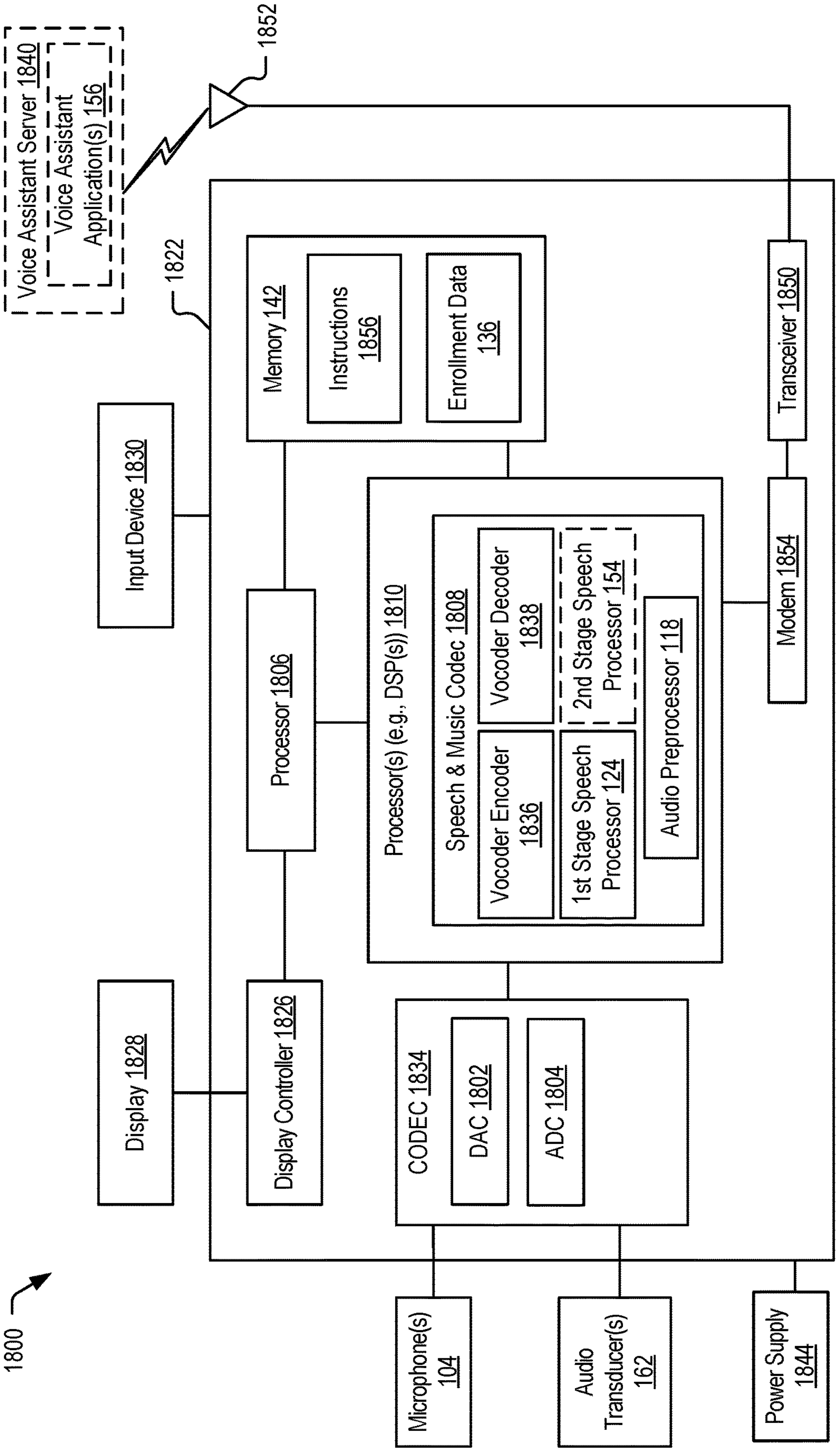
FIG. 18 is a block diagram of a particular illustrative example of a device that is operable to perform speaker-specific speech filtering for multiple users, in accordance with some examples of the present disclosure.

Referring to FIG. 18, a block diagram of a particular illustrative implementation of a device is depicted and generally designated 1800. In various implementations, the device 1800 may have more or fewer components than illustrated in FIG. 18. In an illustrative implementation, the device 1800 may correspond to the device 102. In an illustrative implementation, the device 1800 may perform one or more operations described with reference to FIGS. 1-17.

In a particular implementation, the device 1800 includes a processor 1806 (e.g., a central processing unit (CPU)). The device 1800 may include one or more additional processors 1810 (e.g., one or more DSPs). In a particular aspect, the processor(s) 190 of FIG. 1 corresponds to the processor 1806, the processors 1810, or a combination thereof. The processor(s) 1810 may include a speech and music coder-decoder (CODEC) 1808 that includes a voice coder ("vocoder") encoder 1836 and a vocoder decoder 1838. In the example illustrated in FIG. 18, the processor(s) 1810 also include the audio preprocessor 118, the first stage speech processor 124, and optionally, the second stage speech processor 154.

The device 1800 may include a memory 142 and a CODEC 1834. In particular implementations, the CODEC 204 of FIGS. 2 and 7 corresponds to the CODEC 1834 of FIG. 18. The memory 142 may include instructions 1856 that are executable by the one or more additional processors 1810 (or the processor 1806) to implement the functionality described with reference to the audio preprocessor 118, the first stage speech processor 124, the second stage speech processor 154, or a combination thereof. In the example illustrated in FIG. 18, the memory 142 also includes the enrollment data 136.

The device 1800 may include a display 1828 coupled to a display controller 1826. The audio transducer(s) 164, the microphone(s) 104, or both, may be coupled to the CODEC 1834. The CODEC 1834 may include a digital-to-analog converter (DAC) 1802, an analog-to-digital converter (ADC) 1804, or both. In a particular implementation, the CODEC 1834 may receive analog signals from the microphone(s) 104, convert the analog signals to digital signals (e.g. the audio data 116 of FIG. 1) using the analog-to-digital converter 1804, and provide the digital signals to the speech and music codec 1808. The speech and music codec 1808 may process the digital signals, and the digital signals may further be processed by the audio preprocessor 118, the first stage speech processor 124, the second stage speech processor 154, or a combination thereof. In a particular implementation, the speech and music codec 1808 may provide digital signals to the CODEC 1834. The CODEC 1834 may convert the digital signals to analog signals using the digital-to-analog converter 1802 and may provide the analog signals to the audio transducer(s) 164.

In a particular implementation, the device 1800 may be included in a system-in-package or system-on-chip device 1822. In a particular implementation, the memory 142, the processor 1806, the processors 1810, the display controller 1826, the CODEC 1834, and a modem 1854 are included in the system-in-package or system-on-chip device 1822. In a particular implementation, an input device 1830 and a power supply 1844 are coupled to the system-in-package or the system-on-chip device 1822. Moreover, in a particular implementation, as illustrated in FIG. 18, the display 1828, the input device 1830, the audio transducer(s) 164, the microphone(s) 104, an antenna 1852, and the power supply 1844 are external to the system-in-package or the system-on-chip device 1822. In a particular implementation, each of the display 1828, the input device 1830, the audio transducer(s) 164, the microphone(s) 104, the antenna 1852, and the power supply 1844 may be coupled to a component of the system-in-package or the system-on-chip device 1822, such as an interface or a controller.

In some implementations, the device 1800 includes the modem 1854 coupled, via a transceiver 1850, to the antenna 1852. In some such implementations, the modem 1854 may be configured to send data associated with the utterance from the first person (e.g., at least a portion of the audio data 116 of FIG. 1) to a remote voice assistant server 1840. In such implementations, the voice assistant application(s) 156 execute at the voice assistant server 1840. In such implementations, the second stage speech processor 154 can be omitted from the device 1800; however, speaker-specific speech input filtering can be performed at the device 1800.

The device 1800 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for detecting speech of a first user and a second user. For example, the means for detecting speech of a first user and a second user can correspond to the device 102, the microphone(s) 104, the processor(s) 190, the audio analyzer 140, the audio preprocessor 118, the speech input filter(s) 120, the first stage speech processor 124, the wake word detector 126, the speaker detector 128, the integrated circuit 802, the processor 1806, the processor(s) 1810, one or more other circuits or components configured to detect speech of a first user and a second user, or any combination thereof.

The apparatus includes means for obtaining first speech signature data associated with the first user and second speech signature data associated with the second user. For example, the means for obtaining the first speech signature data and the second speech signature data can correspond to the device 102, the processor(s) 190, the audio analyzer 140, the audio preprocessor 118, the speech input filter(s) 120, the first stage speech processor 124, the speaker detector 128, the integrated circuit 802, the processor 1806, the processor(s) 1810, one or more other circuits or components configured to obtain the speech signature data, or any combination thereof.

The apparatus also includes means for selectively enabling a first speaker-specific speech input filter that is based on the first speech signature data to generate a first speech output signal corresponding to the speech of the first user. For example, the means for selectively enabling the first speaker-specific speech input filter can correspond to the device 102, the processor(s) 190, the audio analyzer 140, the audio preprocessor 118, the speech input filter(s) 120, the first stage speech processor 124, the speaker detector 128, the integrated circuit 802, the processor 1806, the processor(s) 1810, one or more other circuits or components configured to selectively enable the first speaker-specific speech input filter, or any combination thereof.

The apparatus also includes means for selectively enabling a second speaker-specific speech input filter that is based on the second speech signature data to generate a second speech output signal corresponding to the speech of the second user. For example, the means for selectively enabling the second speaker-specific speech input filter can correspond to the device 102, the processor(s) 190, the audio analyzer 140, the audio preprocessor 118, the speech input filter(s) 120, the first stage speech processor 124, the speaker detector 128, the integrated circuit 802, the processor 1806, the processor(s) 1810, one or more other circuits or components configured to selectively enable the second speaker-specific speech input filter, or any combination thereof.

In some implementations, a non-transient computer-readable medium (e.g., a computer-readable storage device, such as the memory 142) includes instructions (e.g., the instructions 1856) that, when executed by one or more processors (e.g., the one or more processors 190, the one or more processors 1810, or the processor 1806), cause the one or more processors to detect speech of a first user and a second user, obtain first speech signature data associated with the first user and second speech signature data associated with the second user, selectively enable a first speaker-specific speech input filter that is based on the first speech signature data to generate a first speech output signal corresponding to the speech of the first user, and selectively enable a second speaker-specific speech input filter that is based on the second speech signature data to generate a second speech output signal corresponding to the speech of the second user.

Particular aspects of the disclosure are described below in sets of interrelated Examples:

According to Example 1, a device includes: one or more processors configured to: detect speech of a first user and a second user; obtain first speech signature data associated with the first user and second speech signature data associated with the second user; selectively enable a first speaker-specific speech input filter that is based on the first speech signature data to generate a first speech output signal corresponding to the speech of the first user; and selectively enable a second speaker-specific speech input filter that is based on the second speech signature data to generate a second speech output signal corresponding to the speech of the second user.

Example 2 includes the device of Example 1, wherein the one or more processors are implemented in a vehicle and are configured to: selectively enable the first speaker-specific speech input filter based on a first seating location within the vehicle of the first user; and selectively enable the second speaker-specific speech input filter based on a second seating location within the vehicle of the second user.

Example 3 includes the device of Example 2, wherein the one or more processors are further configured to detect, based on sensor data from one or more sensors of the vehicle, that the first user is at the first seating location and that the second user is at the second seating location.

Example 4 includes the device of Example 2 or Example 3, wherein the one or more processors are further configured to process audio data received from one or more microphones in the vehicle to: generate a first zone audio signal that includes sounds originating in a first zone of multiple logical zones of the vehicle and that at least partially attenuates sounds originating outside of the first zone, wherein the first zone includes the first seating location; and generate a second zone audio signal that includes sounds originating in a second zone of the multiple logical zones and that at least partially attenuates sounds originating outside of the second zone, wherein the second zone includes the second seating location.

Example 5 includes the device of Example 4, wherein the one or more processors are further configured to: enable the first speaker-specific speech input filter as part of a first filtering operation of the first zone audio signal to enhance the speech of the first user, attenuate sounds other than the speech of the first user, or both, to generate the first speech output signal; and enable the second speaker-specific speech input filter as part of a second filtering operation of the second zone audio signal to enhance the speech of the second user, attenuate sounds other than the speech of the second user, or both, to generate the second speech output signal.

Example 6 includes the device of any of Examples 1 to 5, wherein the one or more processors are further configured to: provide the first speech output signal as an input to a first voice assistant instance; and provide the second speech output signal as an input to a second voice assistant instance that is distinct from the first voice assistant instance.

Example 7 includes the device of Example 6, wherein generation of the first speech output signal using the first speaker-specific speech input filter substantially prevents the speech of the second user from interfering with a voice assistant session of the first user.

Example 8 includes the device of Example 6 or Example 7, where the first voice assistant instance corresponds to a first instance of a first voice assistant application, and wherein the second voice assistant instance corresponds to a second instance of the first voice assistant application.

Example 9 includes the device of Example 6 or Example 7, wherein the first voice assistant instance corresponds to a first voice assistant application, and wherein the second voice assistant instance corresponds to a second voice assistant application that is distinct from the first voice assistant application.

Example 10 includes the device of any of Examples 6 to 9, wherein the one or more processors are further configured to: activate the first voice assistant instance based on detection of a first wake word in the first speech output signal; and activate the second voice assistant instance based on detection of a second wake word in the second speech output signal.

Example 11 includes the device of any of Examples 1 to 10, wherein the speech of the first user and the speech of the second user overlap in time, wherein the first speaker-specific speech input filter suppresses the speech of the second user during generation of the first speech output signal, and wherein the second speaker-specific speech input filter suppresses the speech of the first user during generation of the second speech output signal.

Example 12 includes the device of any of Examples 1 to 11, wherein the first speech signature data corresponds to a first speaker embedding, and wherein the one or more processors are configured to enable the first speaker-specific speech input filter by providing the first speaker embedding as an input to a speech enhancement model.

Example 13 includes the device of any of Examples 1 to 12, wherein the one or more processors are further configured to: during an enrollment operation: generate the first speech signature data based on one or more utterances of the first user; and store the first speech signature data in a speech signature storage; and after the enrollment operation, retrieve the first speech signature data from the speech signature storage based on identifying a presence of the first user.

Example 14 includes the device of any of Examples 1 to 13, wherein the one or more processors are further configured to process the speech of the second user to generate the second speech signature data.

Example 15 includes the device of any of Examples 1 to 14, further including a microphone configured to capture the speech of the first user, the speech of the second user, or both.

Example 16 includes the device of any of Examples 1 to 15, further including a modem configured to send data associated with the first speech output signal to a remote voice assistant server.

Example 17 includes the device of any of Examples 1 to 16, further including a speaker configured to output sound corresponding to a voice assistant response to the speech of the first user.

Example 18 includes the device of any of Examples 1 to 17, further including a display device configured to display data corresponding to a voice assistant response to the speech of the first user.

According to Example 19, a method includes: detecting, at one or more processors, speech of a first user and a second user; obtaining, at the one or more processors, first speech signature data associated with the first user and second speech signature data associated with the second user; selectively enabling, at the one or more processors, a first speaker-specific speech input filter that is based on the first speech signature data to generate a first speech output signal corresponding to the speech of the first user; and selectively enabling, at the one or more processors, a second speaker-specific speech input filter that is based on the second speech signature data to generate a second speech output signal corresponding to the speech of the second user.

Example 20 includes the method of Example 19, wherein the first speaker-specific speech input filter is selectively enabled based on a first seating location of the first user within a vehicle, and wherein the second speaker-specific speech input filter is selectively enabled based on a second seating location of the second user within the vehicle.

Example 21 includes the method of Example 20, further including detecting, based on sensor data from one or more sensors of the vehicle, that the first user is at the first seating location and that the second user is at the second seating location.

Example 22 includes the method of Example 20 or Example 21, further including processing audio data received from one or more microphones in the vehicle, including: generating a first zone audio signal that includes sounds originating in a first zone of multiple logical zones of the vehicle and that at least partially attenuates sounds originating outside of the first zone, wherein the first zone includes the first seating location; and generating a second zone audio signal that includes sounds originating in a second zone of the multiple logical zones and that at least partially attenuates sounds originating outside of the second zone, wherein the second zone includes the second seating location.

Example 23 includes the method of Example 22, further including: enabling the first speaker-specific speech input filter as part of a first filtering operation of the first zone audio signal to enhance the speech of the first user, attenuate sounds other than the speech of the first user, or both, to generate the first speech output signal; and enabling the second speaker-specific speech input filter as part of a second filtering operation of the second zone audio signal to enhance the speech of the second user, attenuate sounds other than the speech of the second user, or both, to generate the second speech output signal.

Example 24 includes the method of any of Examples 19 to 24, further including: providing the first speech output signal as an input to a first voice assistant instance; and providing the second speech output signal as an input to a second voice assistant instance that is distinct from the first voice assistant instance.

Example 25 includes the method of Example 24, wherein generation of the first speech output signal using the first speaker-specific speech input filter substantially prevents the speech of the second user from interfering with a voice assistant session of the first user.

Example 26 includes the method of Example 24 or Example 25, where the first voice assistant instance corresponds to a first instance of a first voice assistant application, and wherein the second voice assistant instance corresponds to a second instance of the first voice assistant application.

Example 27 includes the method of Example 24 or Example 26, wherein the first voice assistant instance corresponds to a first voice assistant application, and wherein the second voice assistant instance corresponds to a second voice assistant application that is distinct from the first voice assistant application.

Example 28 includes the method of any of Examples 24 to 27, further including: activating the first voice assistant instance based on detection of a first wake word in the first speech output signal; and activating the second voice assistant instance based on detection of a second wake word in the second speech output signal.

Example 29 includes the method of any of Examples 19 to 28, wherein the speech of the first user and the speech of the second user overlap in time, wherein the first speaker-specific speech input filter suppresses the speech of the second user during generation of the first speech output signal, and wherein the second speaker-specific speech input filter suppresses the speech of the first user during generation of the second speech output signal.

Example 30 includes the method of any of Examples 19 to 29, wherein the first speech signature data corresponds to a first speaker embedding, and wherein enabling the first speaker-specific speech input filter includes providing the first speaker embedding as an input to a speech enhancement model.

Example 31 includes the method of any of Examples 19 to 30, further including: during an enrollment operation: generating the first speech signature data based on one or more utterances of the first user; and storing the first speech signature data in a speech signature storage; and after the enrollment operation, retrieving the first speech signature data from the speech signature storage based on identifying a presence of the first user.

Example 32 includes the method of any of Examples 19 to 31, further including processing the speech of the second user to generate the second speech signature data.

Example 33 includes the method of any of Examples 19 to 32, further including capturing the speech of the first user, the speech of the second user, or both, via a microphone.

Example 34 includes the method of any of Examples 19 to 33, further including sending data associated with the first speech output signal to a remote voice assistant server.

Example 35 includes the method of any of Examples 19 to 34, further including outputting sound corresponding to a voice assistant response to the speech of the first user.

Example 36 includes the method of any of Examples 19 to 35, further including displaying data corresponding to a voice assistant response to the speech of the first user.

Example 37 includes an apparatus including means for performing the method of any of Examples 19 to 36.

Example 38 includes a non-transient computer-readable medium storing instructions that, when executed by a processor, cause the processor to perform the method of any of Examples 19 to 36.

Example 39 includes a device including: a memory storing instructions; and a processor configured to execute the instructions to perform the method of any of Examples 19 to 36.

According to Example 40, a non-transient computer-readable medium stores instructions that, when executed by one or more processors, cause the one or more processors to: detect speech of a first user and a second user; obtain first speech signature data associated with the first user and second speech signature data associated with the second user; selectively enable a first speaker-specific speech input filter that is based on the first speech signature data to generate a first speech output signal corresponding to the speech of the first user; and selectively enable a second speaker-specific speech input filter that is based on the second speech signature data to generate a second speech output signal corresponding to the speech of the second user.

Example 41 includes the non-transient computer-readable medium of Example 40, wherein the instructions are executable to further cause the one or more processors to: generate a first zone audio signal that includes sounds originating in a first zone of multiple logical zones of a vehicle and that at least partially attenuates sounds originating outside of the first zone, wherein the first zone includes a first seating location of the first user; and generate a second zone audio signal that includes sounds originating in a second zone of the multiple logical zones and that at least partially attenuates sounds originating outside of the second zone, wherein the second zone includes a second seating location of the second user.

According to Example 42, an apparatus includes: means for detecting speech of a first user and a second user; means for obtaining first speech signature data associated with the first user and second speech signature data associated with the second user; means for selectively enabling a first speaker-specific speech input filter that is based on the first speech signature data to generate a first speech output signal corresponding to the speech of the first user; and means for selectively enabling a second speaker-specific speech input filter that is based on the second speech signature data to generate a second speech output signal corresponding to the speech of the second user.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

one or more processors configured to:

detect speech of a first user and a second user as first speech data;

obtain, based on the first speech data, first speech signature data associated with the first user and second speech signature data associated with the second user;

selectively enable a first speaker-specific speech input filter that is based on the first speech signature data to generate a first speech output signal corresponding to the speech of the first user;

selectively enable a second speaker-specific speech input filter that is based on the second speech signature data to generate a second speech output signal corresponding to the speech of the second user;

process second speech data using the first speaker-specific speech input filter and the second speaker-specific speech input filter in parallel to generate a first output associated with the first user and a second output associated with the second user;

process the first speech output signal using a first voice assistant instance activated at the device and the second speech output signal using a second voice assistance instance activated at the device, the first voice assistant instance distinct from the second voice assistant instance;

receive, at the first voice assistant instance while a first voice assistant session is active, a corresponding output of the first speaker-specific speech input filter; and receive, at the second voice assistant instance while a second voice assistant session is active, a corresponding output of the second speaker-specific speech input filter.

2. The device of claim 1, wherein the one or more processors are implemented in a vehicle and are configured to:

determine a first seating location within the vehicle of the first user based on the first speech data;

selectively enable the first speaker-specific speech input filter based on the first seating location;

determine a second seating location within the vehicle of the second user based on the first speech data; and selectively enable the second speaker-specific speech input filter based on the second seating location.

3. The device of claim 2, wherein the one or more processors are further configured to detect, based on sensor data from one or more sensors of the vehicle, that the first user is at the first seating location and that the second user is at the second seating location.

4. The device of claim 2, wherein the one or more processors are further configured to process audio data received from one or more microphones in the vehicle to:

generate a first zone audio signal that includes sounds originating in a first zone of multiple logical zones of the vehicle and that at least partially attenuates sounds originating outside of the first zone, wherein the first zone includes the first seating location; and generate a second zone audio signal that includes sounds originating in a second zone of the multiple logical zones and that at least partially attenuates sounds originating outside of the second zone, wherein the second zone includes the second seating location.

5. The device of claim 4, wherein the one or more processors are further configured to:

enable the first speaker-specific speech input filter as part of a first filtering operation of the first zone audio signal to enhance the speech of the first user, attenuate sounds other than the speech of the first user, or both, to generate the first speech output signal; and enable the second speaker-specific speech input filter as part of a second filtering operation of the second zone audio signal to enhance the speech of the second user, attenuate sounds other than the speech of the second user, or both, to generate the second speech output signal.

6. The device of claim 1, wherein a first particular processor of the one or more processors selectively enables the first speaker-specific speech input filter and selectively enables the second speaker-specific speech input filter, and wherein a second particular processor of the one or more processors processes the first speech output signal, the first particular processor distinct from the second particular processor.

7. The device of claim 1, wherein generation of the first speech output signal using the first speaker-specific speech input filter substantially prevents the speech of the second user from interfering with a voice assistant session of the first user.

8. The device of claim 1, where the first voice assistant instance corresponds to a first instance of a first voice assistant application, and wherein the second voice assistant instance corresponds to a second instance of the first voice assistant application.

9. The device of claim 1, wherein the first voice assistant instance corresponds to a first voice assistant application, and wherein the second voice assistant instance corresponds to a second voice assistant application that is distinct from the first voice assistant application.

10. The device of claim 1, wherein the one or more processors are further configured to:

activate the first voice assistant instance based on detection of a first wake word in the first speech output signal; and activate the second voice assistant instance based on detection of a second wake word in the second speech output signal.

11. The device of claim 1, wherein the speech of the first user and the speech of the second user overlap in time, wherein the first speaker-specific speech input filter suppresses the speech of the second user during generation of the first speech output signal, and wherein the second speaker-specific speech input filter suppresses the speech of the first user during generation of the second speech output signal.

12. The device of claim 1, wherein the first speech signature data corresponds to a first speaker embedding, and wherein the one or more processors are configured to enable the first speaker-specific speech input filter by providing the first speaker embedding as an input to a speech enhancement model.

13. The device of claim 1, wherein the one or more processors are further configured to:

during an enrollment operation:

generate the first speech signature data based on one or more utterances of the first user; and store the first speech signature data in a speech signature storage; and after the enrollment operation, retrieve the first speech signature data from the speech signature storage based on identifying a presence of the first user.

14. The device of claim 1, wherein the one or more processors are further configured to process the speech of the second user to generate the second speech signature data.

15. The device of claim 1, further comprising a microphone configured to capture the speech of the first user, the speech of the second user, or both.

16. The device of claim 1, further comprising a modem configured to send data associated with the first speech output signal to a remote voice assistant server.

17. The device of claim 1, further comprising a speaker configured to output sound corresponding to a voice assistant response to the speech of the first user.

18. The device of claim 1, further comprising a display device configured to display data corresponding to a voice assistant response to the speech of the first user.

19. A method comprising:

detecting, at one or more processors of a device, speech of a first user and a second user as first speech data;

obtaining, at the one or more processors based on the first speech data, first speech signature data associated with the first user and second speech signature data associated with the second user;

selectively enabling, at the one or more processors, a first speaker-specific speech input filter that is based on the first speech signature data to generate a first speech output signal corresponding to the speech of the first user;

selectively enabling, at the one or more processors, a second speaker-specific speech input filter that is based on the second speech signature data to generate a second speech output signal corresponding to the speech of the second user;

processing, at the one or more processors, second speech data using the first speaker-specific speech input filter and the second speaker-specific speech input filter in parallel to generate a first output associated with the first user and a second output associated with the second user;

processing the first speech output signal using a first voice assistant instance activated at the one or more processors and the second speech output signal using a second voice assistance instance activated at the one or more processors, the first voice assistant instance distinct from the second voice assistant instance;

receiving, at the first voice assistant instance while a first voice assistant session is active, a corresponding output of the first speaker-specific speech input filter; and receiving, at the second voice assistant instance while a second voice assistant session is active, a corresponding output of the second speaker-specific speech input filter.

20. The method of claim 19, wherein the first speaker-specific speech input filter is selectively enabled based on a first seating location of the first user within a vehicle, and wherein the second speaker-specific speech input filter is selectively enabled based on a second seating location of the second user within the vehicle.

21. The method of claim 20, further comprising detecting, based on sensor data from one or more sensors of the vehicle, that the first user is at the first seating location and that the second user is at the second seating location.

22. The method of claim 20, further comprising processing audio data received from one or more microphones in the vehicle, including:

generating a first zone audio signal that includes sounds originating in a first zone of multiple logical zones of the vehicle and that at least partially attenuates sounds originating outside of the first zone, wherein the first zone includes the first seating location; and generating a second zone audio signal that includes sounds originating in a second zone of the multiple logical zones and that at least partially attenuates sounds originating outside of the second zone, wherein the second zone includes the second seating location.

23. The method of claim 19, wherein a first particular processor of the one or more processors selectively enables the first speaker-specific speech input filter and selectively enables the second speaker-specific speech input filter, and wherein a second particular processor of the one or more processors processes the first speech output signal, the first particular processor distinct from the second particular processor.

24. The method of claim 19, wherein generation of the first speech output signal using the first speaker-specific speech input filter substantially prevents the speech of the second user from interfering with a voice assistant session of the first user.

25. The method of claim 19, further comprising:

activating the first voice assistant instance based on detection of a first wake word in the first speech output signal; and activating the second voice assistant instance based on detection of a second wake word in the second speech output signal.

26. The method of claim 19, wherein the speech of the first user and the speech of the second user overlap in time, wherein the first speaker-specific speech input filter suppresses the speech of the second user during generation of the first speech output signal, and wherein the second speaker-specific speech input filter suppresses the speech of the first user during generation of the second speech output signal.

27. The method of claim 19, wherein the first speech signature data corresponds to a first speaker embedding, and wherein enabling the first speaker-specific speech input filter includes providing the first speaker embedding as an input to a speech enhancement model.

28. A non-transient computer-readable medium storing instructions that, when executed by one or more processors of a device, cause the one or more processors to:

detect speech of a first user and a second user as first speech data;

obtain, based on the first speech data, first speech signature data associated with the first user and second speech signature data associated with the second user;

selectively enable a first speaker-specific speech input filter that is based on the first speech signature data to generate a first speech output signal corresponding to the speech of the first user;

selectively enable a second speaker-specific speech input filter that is based on the second speech signature data to generate a second speech output signal corresponding to the speech of the second user;

process second speech data using the first speaker-specific speech input filter and the second speaker-specific speech input filter in parallel to generate a first output associated with the first user and a second output associated with the second user;

process the first speech output signal using a first voice assistant instance activated at the one or more processors and the second speech output signal using a second voice assistance instance activated at the one or more processors, the first voice assistant instance distinct from the second voice assistant instance;

receive, at the first voice assistant instance while a first voice assistant session is active, a corresponding output of the first speaker-specific speech input filter; and receive, at the second voice assistant instance while a second voice assistant session is active, a corresponding output of the second speaker-specific speech input filter.

29. The non-transient computer-readable medium of claim 28, wherein the instructions are executable to further cause the one or more processors to:

generate a first zone audio signal that includes sounds originating in a first zone of multiple logical zones of a vehicle and that at least partially attenuates sounds originating outside of the first zone, wherein the first zone includes a first seating location of the first user; and generate a second zone audio signal that includes sounds originating in a second zone of the multiple logical zones and that at least partially attenuates sounds originating outside of the second zone, wherein the second zone includes a second seating location of the second user.

30. An apparatus comprising:

means for detecting speech of a first user and a second user as first speech data;

means for obtaining, based on the first speech data, first speech signature data associated with the first user and second speech signature data associated with the second user;

means for selectively enabling a first speaker-specific speech input filter that is based on the first speech signature data to generate a first speech output signal corresponding to the speech of the first user;

means for selectively enabling a second speaker-specific speech input filter that is based on the second speech signature data to generate a second speech output signal corresponding to the speech of the second user;

means for processing second speech data using the first speaker-specific speech input filter and the second speaker-specific speech input filter in parallel to generate a first output associated with the first user and a second output associated with the second user;

means for processing the first speech output signal using a first voice assistant instance activated at a device and the second speech output signal using a second voice assistance instance activated at the device, the first voice assistant instance distinct from the second voice assistant instance;

means for receiving, at the first voice assistant instance while a first voice assistant session is active, a corresponding output of the first speaker-specific speech input filter; and means for receiving, at the second voice assistant instance while a second voice assistant session is active, a corresponding output of the second speaker-specific speech input filter.

* * * * *